US006798772B2

(12) United States Patent
Bergman et al.

(10) Patent No.: US 6,798,772 B2
(45) Date of Patent: *Sep. 28, 2004

(54) METHOD FOR PUBLIC ACCESS TO PRIVATE PHONE NUMBERS AND OTHER TELEPHONIC PERIPHERALS USING A CALLER ACCESS CODE

(75) Inventors: Richard G. Bergman, Williamson, NY (US); Stephen D. Knight, Rochester, NY (US); Thomas J. Kredo, Rochester, NY (US); George Hillenbrand, Rochester, NY (US)

(73) Assignee: Nortel Network Limited, Quebec (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,865

(22) Filed: Sep. 7, 1999

(65) Prior Publication Data

US 2003/0128691 A1 Jul. 10, 2003

(51) Int. Cl.⁷ .......................... H04L 12/66; H04L 12/28; H04M 11/00
(52) U.S. Cl. .................. 370/354; 370/389; 370/395.52; 379/90.01; 709/227
(58) Field of Search ................................. 370/352, 353, 370/354, 338, 356, 389, 392, 396, 395.21, 395.52; 709/220, 223, 227; 379/90.01

(56) References Cited

U.S. PATENT DOCUMENTS

| 4,446,334 A | 5/1984 | Groff |
| 5,208,848 A | 5/1993 | Pula |
| 5,276,731 A | 1/1994 | Arbel et al. |
| 5,329,578 A | 7/1994 | Brennan et al. |
| 5,680,446 A | 10/1997 | Fleischer, III et al. |
| 5,806,043 A | 9/1998 | Toader |
| 5,809,114 A | 9/1998 | Solomon et al. |
| 5,818,836 A | 10/1998 | DuVal |
| 5,867,495 A | 2/1999 | Elliott et al. |
| 5,884,271 A | 3/1999 | Pitroda |
| 5,892,821 A * | 4/1999 | Turner |
| 5,943,395 A * | 8/1999 | Hansen |
| 6,018,579 A | 1/2000 | Petrunka |
| 6,240,449 B1 * | 5/2001 | Nadeau |
| 6,259,691 B1 * | 7/2001 | Naudus |
| 6,442,169 B1 * | 8/2002 | Lewis |

* cited by examiner

Primary Examiner—Afsar Qureshi
(74) Attorney, Agent, or Firm—Hunton & Williams LLP

(57) ABSTRACT

A caller places a telephone call and enters an access code when calling a subscriber. The caller's access code signal is generated by the caller when the caller inputs his or her access code. The call is transmitted over the Public Switched Telephone Network to a subscriber's telephone number. A Call Router Server capable of receiving the caller's telephone call and the caller's access code signal is provided. The Call Router Server detects the caller's access code signal and then directing the caller's telephone call to the subscriber to be completed in a particular manner based upon the caller's access code. An Access Code Server which is Web server is provided that allows a subscriber to input the manner in which incoming telephone calls will be received and completed based upon the access code signal that is received by the Call Router Server. This information is stored on a Database Server, which instructs the Call Router Server on the proper routing pattern of the incoming telephone call.

35 Claims, 18 Drawing Sheets http://www.settingyourphone.com

WEB PAGE 1-BASIC INSTRUCTIONS

Access Code Routing: With the Access Code Routing Service you selected, callers to your telephone number will not be able to get through unless they posses certain access codes. You may select certain "telephonic peripherals" (services that are connected to your telephone number), such a pager, cellular phone, or e-mail with voice attachment. Other services include call waiting and call forwarding. The caller will be able to access only those telephonic peripherals you have selected for the access code you have supplied the caller. You may also select a "default" selection for callers who call without access codes.

You may enter as many or as few access codes as you like. The more access codes you use, the greater control you will have but the greater the complexity. Likewise, the fewer codes promote simplicity at the cost of individualized control.

The access codes may be from 1-15 digits long. The access codes can be made of words made on the front panel of your Touch Tone ® phone. Pass your access code out to friends, neighbors, and business associates. Simply check off the box of the options you would like people with this access code to have. The caller will receive a voice prompt telling them of the options available for the access code you have provided them. They will then be asked which of the available Internet/phone service they would like to use.

For instance, if you select a private line, pager and e-mail with a voice attachment for access code 5286 and you are not home, the caller who uses access code 5286 will hear, "The person you have called is not home. You have entered access code 5286. Select 1 if you would like to leave an e-mail with a voice attachment. Select 2 if you would like to page [Your name.]"

You may give out more than one access code to one person. You may also change the telephonic services available for any access code. However, if you decide to give the same access code to numerous people and you want to change the telephonic peripherals for just one person, you will have to give the other people new access codes. Therefore, there is a risk in giving many people the same access code, although this may make things simple.

[HYPERLINK: More Instructions: If you have not read all the instructions, please click here. (Goes to Web Page 2)]

[HYPERLINK: If you would like more information about your telephone options (telephonic peripherals) please click here. (Goes to Web Page 2)].

[HYPERLINK: If you have read the instructions and would like to enter new access codes, please click here. (Goes to Web Page 3)].

[HYPERLINK: If you would like to review to whom you gave access codes, click here. (Goes to Web Page 4)].

[HYPERLINK: Click here to set your default options for people without access codes ( Web Page not shown, but similar to Web Page 4 with exact same selection of telephonic peripherals)].

CLID ROUTING: You may also elect to have certain telephone calls from particular phone numbers pass without the caller having to enter an access code. Callers calling from these chosen phone numbers will not have to enter an access code. This is known as "Calling Line Identification Number (CLID) Routing." For instance, you could arrange all callers from telephone number 716-123-1234 to have access to your phone service, regardless of whether they have a telephone.

[HYPERLINK: CLID ROUTING: If you would like to have certain calls from certain phone numbers to have access without using access codes , click here. (Goes to Web Page 8).]

Fig. 3

WEB PAGE 2--Your Telephone Options

WEB PAGE 2--Your Telephone Options

Call Waiting: Call waiting will allow callers to send a ring signal while you are on the phone line with someone else. If you do not check this box off, the caller will not have call-waiting privileges, and your call will not be interrupted with a call waiting beep. This feature allows you to select who will interrupt your call.

Call Query: This feature will ask the purpose for the call. The caller will hear, "You have input access code 5286. Please state the purpose of the phone call after the beep." The message will be relayed to you and you can decide whether to take the call. You will hear, "You have just received a message from a person with access code 5286. He states the purpose of the phone call is [play recording]. If you wish to accept the call, press 1. Press 2 if you want the call to go to your voice mailbox.

Local Line Portability: If you will be leaving the area and want certain people with certain access codes to be able to reach you, simply forward all calls from people with those access codes to you new phone number. Should the phone number of your pager or cellular phone change, enter that information as well. If your e-mail address changes, that also must be updated. [ HYPERLINK: Click here to change phone numbers of your private lines, cellular phones, pagers, or e-mail addresses. (Goes to web page 7)]

Personalized Message: If your computer is equipped with Voice Over the Internet, you can make your personalized message now. Otherwise you can change your personal message (1, 2, or 3) by calling your telecommunications provider. [HYPERLINK: Click Here if you are equipped with Voice Over the Internet and would like to change your personalized messages now. (Next web page not shown).]

Time stamping: Any one option may be make valid for a given period of time. You have two options of time-stamping. Under the calender option, you specify the start date (and time) and the end date (and time) the option would be available. For instance, you can arrange that a person with access code 7339 may only use your private line from April 23 at 3:00 p.m. - June 7$^{th}$ at 3:00 p.m. Under the day of week, time of day option, you specify what days of the week and what time of day you would be available. For instance, you may say that a person with access code 6241 may only use your pager on Monday - Friday, 9:00 am - 6:00 p.m. Simply click on the time-stamping box next to the options you want to be available for that option.

Setting-up or Changing the Telephone Number of Your Telephonic Peripheral Options: Your cellular phone, pager and private line have phone numbers. The phone numbers may change. You may want to change the number of your pager, your private line, or cellular phone as you switch services. [HYPERLINK: Click Here to change the phone number or Internet addresses of your telephonic peripherals. Goes to Web Page 7].

Private Line: Provides a private line that may not be accessed without an access code.

Cellular Phone: Provides a cellular phone line that may not be accessed without an access code.

Pager: Provides a pager line that may not be accessed without an access code.

Call Waiting: If you do not have a separate line for the Internet and you connect to the Internet using a voice line, you may want to be notified that soneone is calling you. You may also want to make sure that your Internet session is not interrupted. If a caller places a call while on the Internet, you will be notified that that caller is trying to reach you by a sound prompt or pop-up window on your computer screen. You then take the telephone call using the Voice Over the Internet option on your personal computer. Your Internet session will not be interrupted.

Setting-up or Changing Internet Addresses: If you have e-mail with a voicemail attachment, your web address may change. [HYPERLINK: Click Here to change the web address of e-mail with a voice mail attachment or other telephonic peripherals that have web addresses. Goes to Web Page 7]

Setting Up Your Access Codes: Now that you have read this instruction sheet, it is time to set up your access codes [HYPERLINK: Click Here to set up your access codes. (Goes to Web Page 3).]

[HYPERLINK: Click here to go back to Home Page: (Goes to Web Page 1)]

Fig. 4

WEB PAGE 3

ACCESS CODE ENTRY FORM

Enter Access Code Here:_____

The system will notify you if you have already entered the access code and ask you if you would like to delete the original access code or edit the original access code.

If your Access Code forms a word on a Touch Tone® phone,
please enter the word here: _____

The system will notify you if numbers of the access codes do not spell out the name you have selected on a standard Touch Tone® phone.

Please enter the name of new people you will give access codes to: _____

[HYPERLINK: To delete names that you have entered for this access code, please click here. (Web Page Not Shown)]

[HYPERLINK: Click Here for an alphabetical listing of all people and their access codes, Goes to Web Page 6]

[HYPERLINK: Click Here to SUBMIT (Automatically jumps to Web Page 4 so that telephonic peripherals may be added for that access code)]

Fig. 5

WEB PAGE 4

Options for Access Code [Automatically Displays Access Code Selected]

If you do not select an option for access code, by default the caller without specified options will have access to your private line at all times and no other options-if the phone is busy, theses callers will be automatically sent to your voice mail box. If you do not have a voice mail box, the caller will receive a busy signal.

If you do not use the time-stamping option, the telephonic peripheral options you have selected will always be available to the caller by default.

Check off telephonic peripherals you would like here.
▫ Private Line 1
    [Click Here for Time Stamp(Goes to Web Page 5)]
▫ Private Line 2
    [Click Here for Time Stamp(Goes to Web Page 5)]
▫ Voice Mail
    [Click Here for Time Stamp (Goes to Web Page 5)]
▫ E-mail With Voice Attachment
    [Click Here for Time Stamp (Goes to Web Page 5)]
▫ Call Forwarding—You must put Number to Be Forwarded Here _ _ _-_ _ _-_ _ _ _
    [Click Here for Time Stamp (Goes to Web Page 5)]
▫ Call Waiting
    [Click Here for Time Stamp (Goes to Web Page 5)]
▫ Personalized Message 1[Click Here to leave Personalized Message if you VoIP]
    [Click Here for Time Stamp (Goes to Web Page 5)]
▫ Personalized Message 2[Click Here to leave Personalized Message if you VoIP]
    [Click Here for Time Stamp (Goes to Web Page 5)]
▫ Personalized Message 3 [Click Here to leave Personalized Message if you VoIP]
    [Click Here for Time Stamp (Goes to Web Page 5)]
▫ Call Query
    [Click Here for Time Stamp (Goes to Web Page 5)]
▫ Pager
    [Click Here for Time Stamp (Goes to Web Page 5)]
▫ Call-Waiting If You Are On Internet
    [Click Here for Time Stamp (Goes to Web Page 5)]
▫ Cellular Phone
    [Click Here for Time Stamp (Goes to Web Page 5)]
[Other telephonic peripherals are listed as they become available...]

[HYPERLINK: Click Here when you are done selecting your options. (Goes to a web page that is not shown that displays chosen options for that access code along with names of people given that access codes. That web page has hyperlink that allows you to edit your selections by returning back to this page)].

[HYPERLINK: Click Here to go back to Home Page: (Goes to Web Page 1)].

Fig. 6

WEB PAGE 5
Time Stamping of Access Codes

You have decided to time-stamp [INSERT NAME OF TELEPHONIC PERIPHERAL SELECTED BY SUBSCRIBER]. [INSERTS NAME OF TELEPHONIC PERIPHERAL] will only be valid for the period of time that you specify. You may pick only one of the following options:

OPTION 1: Calender Scheduling: allows you to input the beginning date and time that the option of [INSERT NAME OF TELEPHONIC PERIPHERAL] will be available to someone with access codes [insert access codes you are programming].

OPTION 2: Day of Week, Time of Day Scheduling: Allows you to specify the time of day and day of week [INSERT NAME OF TELEPHONIC PERIPHERAL] will be available to someone with access code [INSERT ACCESS CODE]. There is a special input for Federal Holidays. There is also a "personalized" day option whereby calls on certain dates will be treated in the special manner that you have selected. Use this option to create special call-treatment for special occasions such as religious holidays, local holidays, or other important dates.

***

OPTION 1: Calender Scheduling:

Enter Start Date _____　　Enter Start Time:_____

Enter End Date _____　　Enter End Time:_____

***

OPTION 2: Day of Week, Time of Day Scheduling:

Monday　　　　　　Enter Time Available_____
Tuesday　　　　　　Enter Time Available_____
Wednesday　　　　Enter Time Available_____
Thursday　　　　　Enter Time Available_____
Friday　　　　　　　Enter Time Available_____
Saturday　　　　　　Enter Time Available_____
Sunday　　　　　　　Enter Time Available_____
Federal Holidays　　Enter Time Available_____

Personalized Dates (Will Override Normal Day of Week, Time of Day Settings)

Enter Start Date _____　　Enter Start Time:_____

Enter End Date _____　　Enter End Time:_____

[HYPERLINK: Click Here to go back to Access Code: (Goes to Web Page 4)]

Fig. 7

WEB PAGE 6

List of Names and Access Codes Given to Them

Here is a list of the people or groups you have given your access code to. If the number corresponds to a name you have selected, the name is also given.

Click on the access code to determine the options available for that access code.

[Every access code is hyperlinked to Web Page 2 for that Access Code so that it may be seen what options were selected for that Access Code. (Individual Hyperlinks not shown)]

(These names are fictitious).

| Name | Access Code |
|---|---|
| Bob Adlair | 2668 (Boot) |
| Mario Botto | 42779 (Happy) |
| Richard Connely | 42779(Happy) |
| Charlie Howard | 2468 |
| Christine Latona | 52779 (Larry) |
| Anne Mooney | 1111 |
| Steve Richards | 264 (Dog) |
| Leonardo Rinaldi | 228 (Cat) |

| Groups | Access Codes |
|---|---|
| Co-Workers | 83269675 (Teamwork) |
| Softball Team | 42779 (Happy) |

[HYPERLINK: Click Here to go back to Home Page: (Goes to Web Page 1)]

Fig. 8

WEB PAGE 7

New Phone Numbers and Web Addresses

The phone number for your private line 1 is \_\_\_-\_\_\_-\_\_\_\_

The phone number for your private line 2 is \_\_\_-\_\_\_-\_\_\_\_

The phone number for your pager is \_\_\_-\_\_\_-\_\_\_\_

The phone number for your cellular phone is \_\_\_-\_\_\_-\_\_\_\_

You e-mail 1 with voice attachment address is: _____@_____.\_\_\_\_\_

You e-mail 2 with voice attachment address is: _____@_____.\_\_\_\_\_

Adding New Telephonic Peripherals With New Phone Numbers

The telephonic peripheral you would like to add is (check 1):

The phone number of your new private line 1 is \_\_\_-\_\_\_-\_\_\_\_

The phone number of your new private line 2 is \_\_\_-\_\_\_-\_\_\_\_

The phone number of your new cellular phone is \_\_\_-\_\_\_-\_\_\_\_

The phone number of your new pager is \_\_\_-\_\_\_-\_\_\_\_

Adding New Telephonic Peripherals With New Web Addresses

The New E-mail address is: _____@_____.\_\_\_\_\_

[HYPERLINK: Click Here to go back to Home Page: (Goes to Web Page 1)]

Fig. 9

WEB PAGE 8

TELEPHONE NUMBER ENTRY FORM (For Routing Based On Caller I.D.)

The phone numbers you enter below will be selected for special treatment. This is called "CLID (Caller ID routing)." If a person calls from the telephone number you designated, the caller will not need an access code. This is a great option for close friends and relatives who you do not to make dial an access code.

Just like access code routing, the caller will receive a voice menu based on the number he is calling from. You select certain "telephonic peripherals" or services that are connected to your telephone number, such a pager, cellular phone, or e-mail with voice attachment, that will be available to caller calling from that particular telephone number. Other services include call waiting and call forwarding. The caller will be able to access only those telephonic peripherals you have selected for calls made from that telephone number, unless you select "Access Code Override".

You may enter as many or as telephone number as you like. The caller will receive a voice prompt telling them of the options available for people calling from that telephone number. They will then be asked which of the available Internet/phone service they would like to use.

For instance, if you select a private line, pager and e-mail with a voice attachment for telephone number 716-123-1234 and you are not home, if the caller calls from 716-123-1234 he or she will hear, "The person you have called is not home. You are calling from 716-123-1234. You need not enter an access code. Select 1 if you would like to leave an e-mail with a voice attachment. Select 2 if you would like to page [Your name.]"

You will have an option that allows the caller to use access codes to receive special treatment if they call from the telephone selected for Caller ID Routing. This way they can still use their access code to access special telephonic peripheral options (cellular phone, page, etc) available to people with their access codes, even though they are calling from a telephone line designated for standard treatment regardless of access code. This is called "Access Code Routing Overriding Caller ID Routing."

Enter Telephone Number Here:_____

[HYPERLINK: Click Here to allow callers with access codes to access telephonic peripheral options not available to others for calling from [prints telephone number] (Web page not shown)]

[HYPERLINK: To delete telephone numbers from Caller Id Routing, please click here. (Web Page Not Shown)]

[HYPERLINK: Click Here for an alphabetical listing of all people and their telephone number selected for Caller I.D. Routing, (Web Page Not Shown)]

[HYPERLINK: Click Here to submit (Automatically jumps to Web Page 9)]

Fig. 10

WEB PAGE 9
Options for Routing Based on Telephone Number of Caller [Automatically Displays Telephone Number Selected]

If you do not select telephonic peripheral options for the telephone number you have selected, by default the caller will have access to your private line at all times and no other options-if the phone is busy, theses callers will be automatically sent to your voice mail box. If you don't have a voice mail box, they will get a busy signal.

If you do not use the time-stamping option, the telephonic peripheral options you have selected will always be available to the caller by default.

Check off telephonic peripherals you would like here for calls made from telephone number [automatically displays telephone number entered by subscriber].

☐ Private Line 1
    [Click Here for Time Stamp(Goes to Web Page 5)]
☐ Private Line 1
    [Click Here for Time Stamp(Goes to Web Page 5)]
☐ Voice Mail
    [Click Here for Time Stamp (Goes to Web Page 5)]
☐ E-mail With Voice Attachment
    [Click Here for Time Stamp (Goes to Web Page 5)]
☐ Call Forwarding—You must put Number to Be Forwarded Here _ _ _ _ _ _ _ _ _ _ _
    [Click Here for Time Stamp (Goes to Web Page 5)]
☐ Call Waiting
    [Click Here for Time Stamp (Goes to Web Page 5)]
☐ Personalized Message 1[Click Here to leave Personalized Message if you VoIP]
    [Click Here for Time Stamp (Goes to Web Page 5)]
☐ Personalized Message 2[Click Here to leave Personalized Message if you VoIP]
    [Click Here for Time Stamp (Goes to Web Page 5)]
☐ Personalized Message 3 [Click Here to leave Personalized Message if you VoIP]
    [Click Here for Time Stamp (Goes to Web Page 5)]
☐ Call Query
    [Click Here for Time Stamp (Goes to Web Page 5)]
☐ Pager
    [Click Here for Time Stamp (Goes to Web Page 5)]
☐ Call-Waiting If You Are On Internet
    [Click Here for Time Stamp (Goes to Web Page 5)]
☐ Access Code Override of CLID Routing [Hyperlink: Goes to Similar page to select telephonic peripherals]
    [Click Here for Time Stamp (Goes to Web Page 5)]
[Other telephonic peripherals are listed as they become available...]

[HYPERLINK: Click Here when you are done selecting your options. (Goes to a web page that is not shown that displays chosen options for that telephone code. That web page has hyperlink that allows you to edit you selections by returning back to this page)].

[HYPERLINK: Click Here to go back to Home Page: (Goes to Web Page 1)].

Fig. 11

WEB PAGE 10

Time Stamping of Calls from Particular Telephone Numbers

You have decided to time-stamp telephone number [INSERTS TELEPHONE NUMBER SELECTED BY SUBSCRIBER] this number will only be valid for the period of time that you specify. At all other times, caller from (insert telephone number) will need access codes. You may pick only one of the following options:

OPTION 1: Calender Scheduling: allows you to input the beginning date and time that the option of [INSERT NAME OF TELEPHONIC PERIPHERAL] will be available to someone calling from telephone number [INSERT TELEPHONE NUMBER SELECTED].

OPTION 2: Day of Week, Time of Day Scheduling: Allows you to specify the time of day and day of week [INSERT NAME OF TELEPHONIC PERIPHERAL] will be available to someone calling from telephone number [INSERT TELEPHONE NUMBER SELECTED]. There is a special input for Federal Holidays. There is also a "personalized" day option whereby calls on certain dates will be treated in the special manner that you have selected. Use this option to create special call-treatment for special occasions such as religious holidays, local holidays, or other important dates.

OPTION 1: Calender Scheduling:

Enter Start Date _____    Enter Start Time:_____

Enter End Date _____    Enter End Time:_____

OPTION 2: Day of Week, Time of Day Scheduling:

| | |
|---|---|
| Monday | Enter Time Available_____ |
| Tuesday | Enter Time Available_____ |
| Wednesday | Enter Time Available_____ |
| Thursday | Enter Time Available_____ |
| Friday | Enter Time Available_____ |
| Saturday | Enter Time Available_____ |
| Sunday | Enter Time Available_____ |
| Federal Holidays | Enter Time Available_____ |

Personalized Dates (Will Override Normal Day of Week, Time of Day Settings)

Enter Start Date _____    Enter Start Time:_____

Enter End Date _____    Enter End Time:_____

[HYPERLINK: Click Here to go back to Telephone Numbers: (Goes to Web Page 8)]

Fig. 12

METHOD FOR PUBLIC ACCESS TO PRIVATE PHONE NUMBERS AND OTHER TELEPHONIC PERIPHERALS USING A CALLER ACCESS CODE

BACKGROUND OF INVENTION

"POTS" is an industry-recognized acronym for "plain, old telephone service." A POTS line is a telephone line, with a telephone number, like the standard ones subscribed to by residences and many small businesses. POTS lines are switched services. Telephone calls made from a POTS line are placed on the Public Switched Telephone Network (PSTN), which is the public telephone service (i.e., the telephone system). When a call is made, the call is coupled through one or more telephone lines and one or more switches to its desired terminus. When a caller places a telephone call, the call is connected to a switch at the central office in the caller's area. The central office is the location, usually a building, that houses telecommunications switching equipment or trafficking systems. At the central office, the call is placed over a central-office trunk, which in turn terminates at another central office in the receiver's area. The central-office trunk is the communications path between the two central offices. After the call is received by the central office in the receiver's area, the call is routed to the recipient.

Modern switching has far surpassed the day when human local operators connected calls to local residences and businesses at the central office. Today's switching involves the use of powerful computers and complex electrical circuits and electronics. The modern central office not only performs traditional switching of analog voice signals, but supports digital voice, text, image and data communications via ISDN (short for "integrated services digital network" which is the digital end to end telecommunications network).

Modern central office switches offers subscribers a wealth of basic and advanced features including: abbreviated dialing, alarm call, call rerouting-busy, call waiting, call rerouting-no answer, call charge indicator, toll-free calling, conference calling, direct dialing to extensions, emergency call area, hot lines, call tracing, incoming call block, individual call record, outgoing traffic limitations, override block, subscriber with special services, subscriber priority, and three-way calling. Advanced features are provided to subscribers whose systems are equipped with ISDN Basic Rate (2B+D) or Primary (23B+D) Interfaces. Advanced features include automatic call-back, call forwarding, call hold, call pickup, call rerouting when busy, call waiting, charge handling, data transmission, dedicated connection, display information, incoming call block, multiline hunt groups, user groups and closed groups. Since the World Wide Web can be accessed via the telephone lines, future services available to telephone subscribers at the central office switch are imponderable.

While all these technological solutions provide valuable options to the subscriber, they have also provided new problems-coordination and administration of these services. A telephone subscriber may want one individual caller to be treated in one manner, and another individual caller to be treated in another manner. For instance, a subscriber may want to allow some individuals but not all callers to ring the subscriber's line. The subscriber may want to allow unfettered access to the subscriber's line for his or her parents, but not a telemarketer. The subscriber may want to be protected against automatic dialers but make sure his or her friends have the ability to place a telephone call to the subscriber undisturbed.

For instance, a subscriber may want to allow a salesperson to call him or her at home, but prevent the salesperson from making follow-up calls, once it is determined that the service or commodity is not desired. Alternatively, a subscriber may want to give someone temporary access with the option of later determining whether they would like to receive that individuals telephone calls. For instance, a subscriber may want to give out a phone number at the beginning of a personal relationship, but deny access to the private line after the relationship is over. Another option is directly routing callers to a voice mailbox should the phone be busy, so that subscriber is undisturbed while other callers that the subscriber may deem of higher priority are put through to call-waiting and are allowed to disrupt the phone call. It is possible the subscriber would like to have some of his or her phone calls forwarded to the residence of friends to be visited that evening, but not others. The telephonic system is programmable so that the subscriber is provided the option of having some of the phone calls forwarded to a cellular phone, or a voice over the Internet connection.

The subscriber may want some callers to receive certain personal announcements, but not others. For instance, the subscriber may want to give directions to the subscriber's residence to people who will be visiting the subscriber's residence tomorrow, leave a reminder to the subscriber's spouse to pick up milk on the way home from work, and leave yet another message to a co-worker that a particular project has been completed. Or, if the subscriber's time is valuable, he may want to charge particular callers fees to speak to the subscriber or access certain services or information. In the business setting, a subscriber may want to have the ability to alter whether a particular person receives a pager, voice mail, e-mail with a voice attachment, or is put through on a voice line. U.S. Pat. No. 5,276,731 entitled "Method and Apparatus for Handling Incoming Telephone Calls" discloses the use of Personal Identification Numbers as applied to the general field of telephony, but does not disclose using the Internet.

The permutations are seemingly endless, and are limited only by the number of potential callers and services provided. Traditionally, the subscriber calls the phone company and selects what service they want. They may be interviewed by a live person at the telephone company, or alternatively, may be put through a voice mail box which will activate certain services by traditional voice or touchpad recognition. Not only is this process cumbersome and laborious, but the data needs to be saved on a computer, adding additional hardware cost to the central office. These computers may not only be expensive, but may be of a proprietary nature in which the telecommunication company would like to limit access. What is needed is a way to coordinate and arrange all these options offered by the telephone company so that they may be put at the subscriber's finger tips.

SUMMARY OF INVENTION

Our invention relates to a method to give a subscriber control over his or her telephone at the subscriber's fingertips through the use of access codes that are distributed to callers. The incoming telephone call may be one made over the "regular" telephone network (the Public Switched Telephone Network) or the Internet. Our invention uses two networks, the public-switched telephone network and the Internet. These two networks are interlinked using an Internet gateway. The marriage of the two networks provides for an unprecedented ability to put control into the hands of the subscriber. Our invention allows the subscriber to dictate how a call is to be routed to the subscriber based on the access code input by the subscriber. This information is input using the Internet, empowering the subscriber with greater control and ease of use.

This invention is directed toward a telephonic system comprised of three major servers: an Access Coder Server (ACS), a Database Server (DBS), and a Call Router Server (CRS). All three servers are computers that have a Central Processing Unit, memory, an operating system and application software. The Access Code Server is an input device for receiving instructions on how to route telephone calls. The Call Router Server is a device that actually routes the incoming telephone call and executes routing instructions. The Access Code Server is on the Internet. The Database Server is a storage device for data used by those routing instructions. The Database Server and the Call Router Server may be either be on the Internet or the Public Switched Telephone Network.

This invention allows a subscriber to program how incoming telephone calls will be treated using the Internet. Using a computer at home, the subscriber inputs data regarding call treatment using a web site which is hosted by an Access Code Server. These data are sent from the Access Code Server to the Database Server where they are stored until needed (i.e., when an incoming telephone call is received).

The Call Router Server receives incoming telephone calls and routes them as outgoing telephone calls. The incoming telephone calls may either be a PSTN telephone call or a VoIP incoming telephone call. The outgoing telephone calls may either be to PSTN telephonic peripherals or to IP telephonic peripherals. The Call Router Server intercepts the incoming telephone call and seeks data from the Data Base Server 94 for routing calls. The Call Router Server forwards the call to the correct telephonic peripheral in accordance with the instructions.

The access code could be a DTMF signal, more commonly known as a Touch-Tone Signal®, entered on the phone key pads. DTMF stands for "Dual-Tone Multiple Frequency" and is widely known in the industry. The keypads on the phone are assigned a unique combination of sounds of two different frequencies. The access code could also be stated verbally by the caller. The access code could even be the mere recognition of the caller's voice, without the articulation of particular words to be spoken.

By "telephonic peripheral" is meant any device that is interconnected to a telephone and is capable of being used in conjunction with the pubic telephone system or the Internet to provide additional service. PSTN telephonic peripherals include, but are not limited to, one or more one-way pagers, one or more two-way pager, emergency operator fallback, one or more wireless phones, one or more private lines, call waiting, call query, one or more voice mail boxes, one or more personalized messages, and video conferencing. Internet telephonic peripherals include, but are not limited to, one or more Internet one way pagers, one or more Internet two way pagers, emergency operator fallback, e-mail with voice attachment, Internet Call Waiting, one or more VoIP private lines, Call Query, any number of Personalized messages, Internet call limits and Internet Video Conferencing.

Internet Video Conferencing.

Using one's computer at home, a modern and a web browser, the subscriber accesses the Access Code Server over the Internet and inputs access code information. Interfacing with a web page, the subscriber enters access code numbers followed by entries indicating the manner of call treatment for each access code. Using the web page, the subscriber selects the services (i.e., the telephonic peripherals to be made available to the caller) that the subscriber wants and determines how each access caller is treated and inputs this data on the Access Code Server. The telephonic system is also capable of allowing the subscriber to select how callers without access codes are treated. The telephonic system is programmable to allow routing either generally without regard to the location that the call is being placed, or based upon the CLID of an incoming PSTN telephone call or the IP address of the incoming VoIP telephone call.

The telephonic system is capable of being programmed by the subscriber so that person A is sent to a pager when he enters his access code; person B is put through to a voice line when she enters her access code; person C receives a message personally addressed to C when he enters his access code; person D has her calls forwarded to a particular residence when she enters her access code person E is able to create e-mail with a voice attachment when he enters his access code; person F is queried as to nature of his call when she enters her access code; person G has the ability when he enters his access code to be on call-waiting and interrupt a phone call with beeping if the subscriber is on the phone; person H is not be allowed when he enters his access code to be on call-waiting and interrupt a phone call with beeping should the subscriber be on the phone; person I is sent to a particular extension when she enters her access code, person J is sent to a particular mailbox of the subscriber when he enters his access code, person K is sent to another mail box when she enters her access code, person L has to pay to speak to the subscriber when he enters his access code; and all people without access codes are able to get through the private line between the hours of 7 P.M. to 8 P.M. by pressing a number on their DTMF phone. The telephonic system is programmable so that other callers may be given the option of calling a number of the telephonic peripherals.

The telephonic system is capable of being programmed so that person M is given the option of being sent to the private line, forwarded to a neighbor's residence where a particular family member is visiting that evening, or paging yet another family member. These options are created by giving person M multiple access codes individually keyed to various telephonic peripherals, or by having one access code trigger a computer-generated voice menu. The subscriber inputs his or her selection into the Access Code Server. The subscriber then distributes access codes to future callers. Routing calls as just described based on the type of access coded may be thought of as "Access Code Routing." The subscriber may decide to keep matters simple and distribute only two or three access codes, whereby one access code is given to one group that is to be treated in one manner, and the second group receives the second access code and is treated in another manner.

Once the subscriber has determined how the incoming telephone call should be treated if certain access codes are entered, this information is sent from the Access Code Server to the Database Server by way of an Access Code Preferences Signal. This information is then stored in a memory of the Database Server. The Call Router Server has a Subscriber's Rules Program which contains the instructions on how to route the incoming telephone call based on the access code entered by the caller.

The caller makes a telephone caller over the Public Switched Telephone Network (PSTN) or the Internet. The telephone call is intercepted by the Call Router Server and the caller is asked for an access code. The Call Router Server transmits the access code to the Data Base Server and requests data for routing the call.

The aforementioned method of routing calls is predicated on the access code of the caller (and is therefore called "access code routing") and is not routed based on the location of the origin of the call. This can be overridden. Callers can be routed based on their telephone number or CLID (acronym for "calling line identification number"). This type of routing may be referred to as "CLID Routing." Under this aspect of our invention, the subscriber could dictate that calls from a particular telephone number (maybe the subscriber's mother's telephone line) is put through to the private line without using an access code. Such a call processing may be thought of as "CLID Routing overriding Access Code Routing" because the system is indifferent as to whether callers from certain CLIDs knew or did not know certain access codes. Our invention contemplates the use of a hybrid of Access Code Routing and CLID Routing.

There is also an option that all callers from a particular CLID will be routed in a particular manner unless they have a particular access code. Suppose a subscriber wanted all calls from a subscriber's spouse's employer to be sent to a voice mailbox so that they are not disturbed during eating hours, but wanted the subscriber's spouse to be able to call home and use the private line. Under such a scenario, the subscriber could program the Access Code Server so that all calls from the spouse's employer's CLID will be answered by a voice mailbox, whereas if the spouse enters his or her access code, the spouse is put directly through to the private line. This process may be thought of as "Access Code Routing overriding CLID Routing" because a person with a particular access code could override the normal setting of call treatment for a particular CLID.

This invention exploits the creative potential of the Internet and employs it in the telephonic environment. Today's Web browsers provide a user friendly environment to use the Internet. The Internet puts the development of information into the hands of subscribers themselves. The Internet represents a unique opportunity to allow the telephone subscriber to control his or her telephone with great ease. The ACS is a Web server which sends a control signal over an Internet to the PSTN call-router. The ACS is a gateway that bridges the public telephonic network with Internet. The subscriber conveniently inputs how the subscriber's telephone is to be used, by using a computer that may be at the subscriber's home or office. The subscriber accesses the Internet using a modem and a Web browser, and enters the URL (Uniform Resource Locator, more colloquially known as the "web address") of the web site located on a Web server that is functioning as the Access Code Server. After accessing the web site, the subscriber can easily alter how each call is handled based on access code to facilitate Access Code Routing. CLID Routing could also be implemented, as could Access Code Routing overriding CLID Routing.

This invention is specifically implemented to provide public access (access from the public telephone network) to a private phone line. The subscriber decides who has access to his phone by distributing access codes. The subscriber could time-stamp the access codes to the private phone line (or for that matter, any of the other telephonic peripherals) so that the private phone line would only be valid for certain time periods. At subscriber's wish, certain callers would have access only during certain times of the day, or a certain period of days, etc. The subscriber may change the access codes that enable a particular caller to access the private phone line. This has the effect of having an unlisted telephone number that constantly can be changed with respect to any one or group of particular callers.

Our invention facilitates Virtual Number Portability. "Virtual Number Portability" is the ability to move outside of a subscriber's immediate switch area but keep the same local telephone number. Virtual Number Portability may (but not must) include the ability to use the same telephone number in other parts of the country, or even other parts of the world. Virtual Number Portability is a step toward "one number for life." People may receive telephone numbers like social security numbers—their individual telephone number would simply follow them wherever they go. To obtain Virtual Number Portability, the subscriber need only use the call forwarding feature and forward telephone calls to the subscriber's new line. It could function as call forwarding on a more permanent basis. As the subscriber moves from one location to another, the subscriber could simply have his or her calls forwarded to the new lines. All this could be easily done by using the Access Code Server. The subscriber would simply find out the phone number of the line he is moving to, and forward all the calls to that number. The subscriber would have the same ability to route telephone calls in particular manners based on available options at the new local. The entire telephonic system is portable. The telephonic peripherals would simply be at the new location. To avoid long-distance trunk charges, the call could be placed using the voice over Internet protocol.

Our invention transcends Virtual Number Portability in that the calls could be divided up as members of a household (or business) move. Thus, there is Individual Virtual Number Portability. Suppose that four people—father, mother, son and daughter—live in Seattle. Further suppose father and mother move to Florida to retire, and son goes to college in New York City and daughter goes to college in Boston. The Access Code Server could easily be programmed so that callers who have the parents' access code are forwarded to their home in Florida; the callers who have the son's code are forwarded to New York; and the callers that who have the daughter's code are directed to the daughter's phone in Boston. Particular callers could also be given multiple access codes and told which access codes will reach what parties. Thus, someone could easily be enabled to call the mother and father, the son and the daughter by simply knowing the original telephone number and the access codes. No matter how many times the children change dorm rooms, or the parents move around the world to sightsee, these numbers would remain valid. This would obviate the necessity of the four to contact all their friends, relatives and business acquittances and tell them of their new phone number.

Currently, phone numbers reveal the general location of a person via the area code and the following three digit exchange. Thus, in order to have a person reach them at their residence this information must be revealed. With our invention, if someone wanted to move without revealing information as to where they are moving, they could since there is no new phone number.

BRIEF DESCRIPTION OF THE DRAWINGS

FIG. 3 is the home page of the web site located on the access server.

FIG. 4 is the second web page located at the access code server.

FIG. 5 is a third web page located on the access code server.

FIG. 6 is a fourth web page located on the access code server.

FIG. 7 is a fifth web page located on the access code server.

FIG. 8 is a sixth web page located on the access code server.

FIG. 9 is a seventh web page located on the access code server.

FIG. 10 is an eighth web page located on the access code server.

FIG. 11 is a ninth web page located on the access code server.

FIG. 12 is a tenth web page located on the access code server.

DETAILED DESCRIPTION OF THE DRAWINGS OF THE PREFERRED EMBODIMENT

Figure 1:
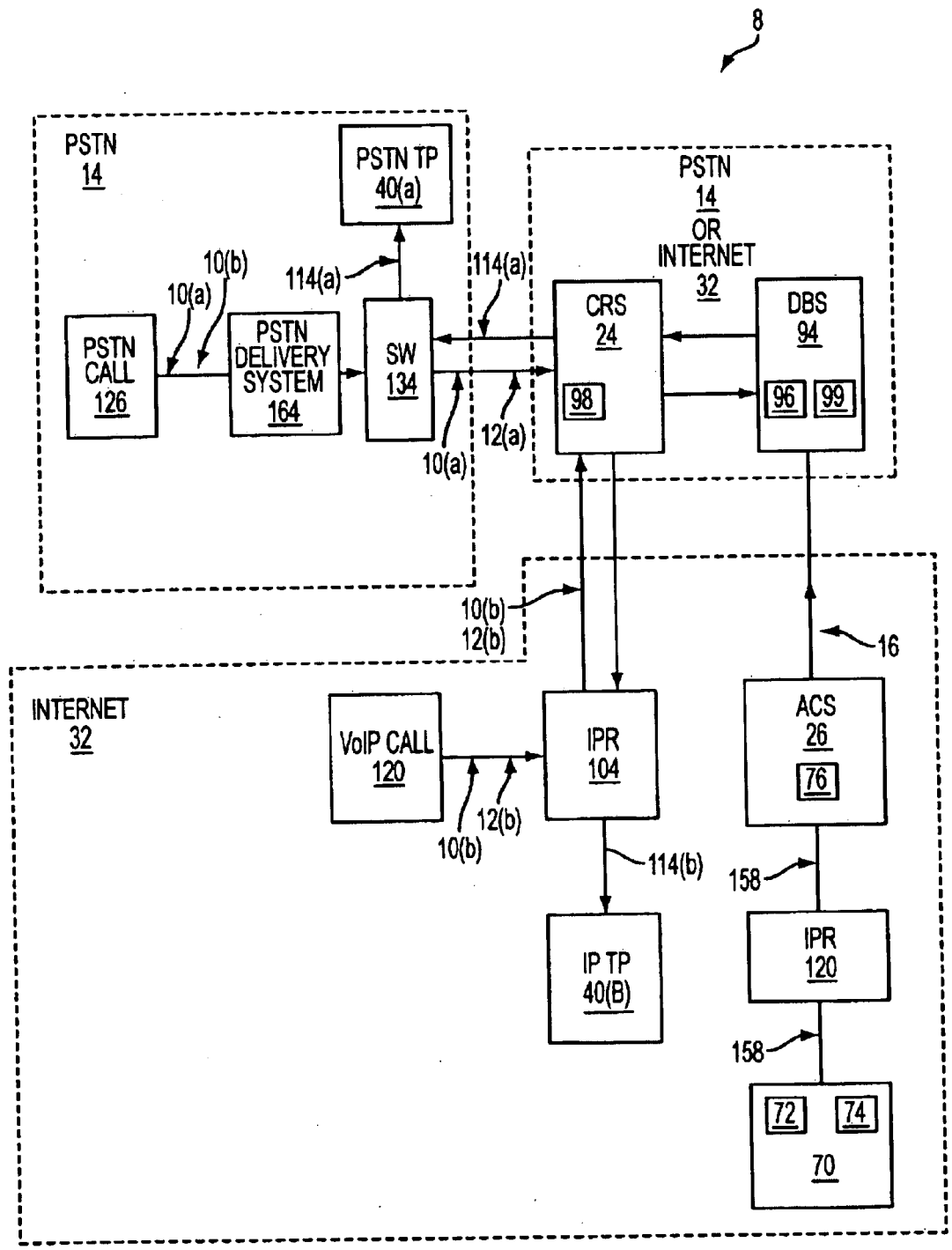
FIG. 1 is a block diagram of the invention.

Detailed embodiments of our invention are disclosed herein. However, the disclosed embodiments are merely exemplary of our invention, which may be embodied in various forms not characterized by the preferred embodiments. Therefore, specific structural and functional details disclosed herein are not to be interpreted as limiting, but merely as a basis for the claims and a representative basis for teaching one skilled in the art to variously employ our invention in any detailed structure. What follows is a preferred embodiment of the invention. Embodiments other than the preferred embodiment are contemplated in the claims.

Brief Overview of Operation

This invention is directed toward a telephonic system 8 comprised of three major servers: the Access Coder Server (ACS) 26, a Database Server (DBS) 94, and a Call Router Server (CRS) 28. All three servers are computers that have a Central Processing Unit, memory, an operating system and application software. The Access Code Server 26 is an input device for data on how to route telephone calls. The Database Server 94 is a storage device for those data. The Call Router Server 28 is a device that actually routes the incoming telephone call in accordance with the stored routing data. The telephonic system 8 may be seen in FIG. 1. The Access Code Server 26 is on the Internet 32. The Database Server 94 and the Call Router Server 28 may be either be on the Internet 32 or the Public Switched Telephone Network 14.

This invention allows a subscriber to use the Internet 32 to program how incoming telephone calls 10(*a*) and 10(*b*). At a computer 70 at home the subscriber inputs data regarding call treatment using a web site 76 which is hosted by an Access Code Server 26. Data is sent from the Access Code Server 26 to the Database Server 94 where it is stored until needed (i.e., when an incoming telephone call is received).

The Call Router Server 28 receives incoming telephone calls 10(*a*) and 10(*b*) and routes them as outgoing telephone calls 114(*a*) and 114(*b*). The incoming telephone calls may either be a PSTN telephone calls 10(*a*) or VoIP incoming telephone calls 10(*b*). The outgoing telephone calls may either be to PSTN telephonic peripherals 40(*a*), or to IP telephonic peripherals 40(*b*). When the incoming telephone call 10(*a*) or 10(*b*) is received by the Call Router Server 28, the Call Router Server 28 seeks routing data regarding call treatment. It sends a signal requesting routing data to the Data Base Server 94 where the routing data are stored. In response, the Data Base Server 94 sends call routing data to the Call Router Server 28. When the Call Router Server 28 is provided with the call routing data, the Call Router Server 28 forwards the call to the correct telephonic peripheral 40(*a*) or 40(*b*) in accordance with the instructions.

Each of the servers is further described followed by a section that indicates how the system operates as a whole. The discussion begins with the telephonic peripherals to which the telephone call will be directed. The discussion continues with the servers need to program and route the incoming telephone calls to those telephonic peripherals.

Telephonic Peripherals

The telephonic system 8 takes incoming telephone calls 10(*a*) and 10(*b*), and sends them to telephonic peripherals 40(*a*) and 40(*b*). The telephonic system 8 is designed to allow the subscriber to easily vary the telephonic peripheral available to the caller making the telephone call based on the caller's access code, the location of where the caller is calling, or a combination of both. By a "telephonic peripheral" it is meant a device capable of receiving an outgoing telephone call in a manner so that it is practically useful to the subscriber. More simply, they are end user devices that ultimately receive the phone call. Those telephonic peripherals located on the Public Switched Telephone Network 14 are numbered 40(*a*). Those telephonic peripherals located on the Internet 32 are number 40(*b*).

Figure 17:
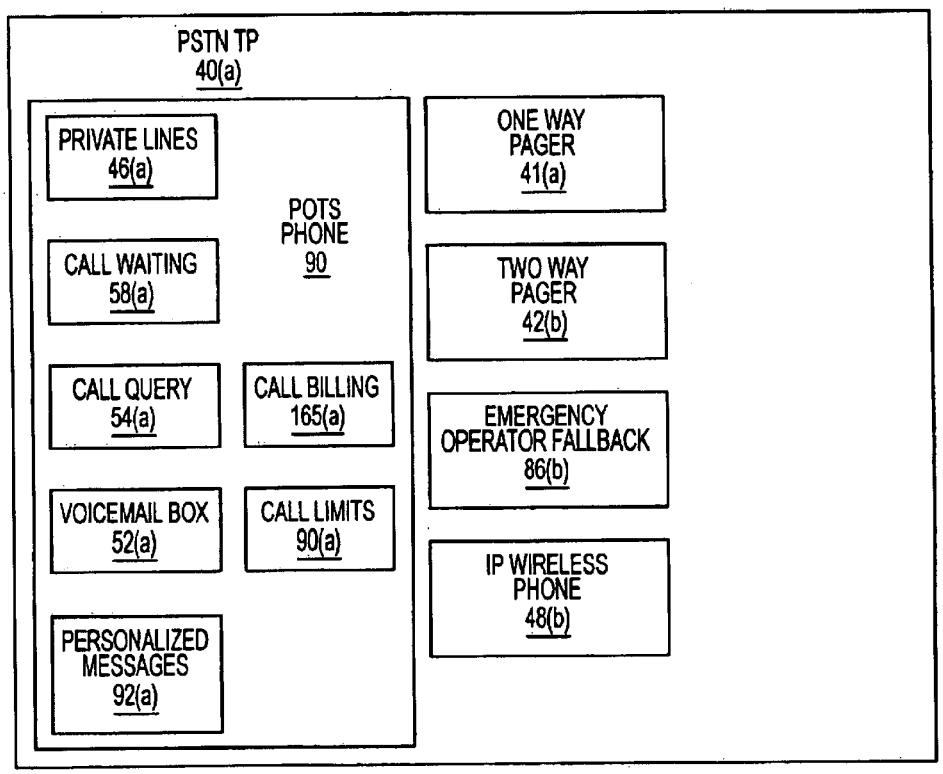
FIG. 17 is a block diagram of the telephonic peripherals on the PSTN.

FIG. 17 shows telephonic peripherals 40(*a*) located on the PSTN. Some of these peripherals are associated with the POTs (Plain Old Telephone) phone of the caller 90 as shown in FIG. 17. These telephonic peripherals could just as easily be associated with other wireless phones. Of those associated with a POTs phone 90, the first telephonic peripheral is the private line 46(*a*). The telephone number for the private lines 40(*a*) are hidden from the public. The private lines 46(*a*) can only be reached by the subscriber programming the system so that the caller is allowed to reach it. There can be one or more private lines 46(*a*). A "private telephone line" is a telephone line whereby the number to the telephone line is known only to the telecommunications provider or is in some other matter kept secure. A "public telephone number" is a telephone number made available to the public either by traditional printed methods—or listing in the phone book—or by the subscriber's giving it away. The callers call the subscriber using the public number. By entering the correct access code, or calling from the right CLID, they are put through to the private line with the telephone number not known to the public.

The private line 46(*a*) telephonic peripheral is very useful. By simply permanently forwarding telephone calls to a new private line located outside the subscriber's area, the subscriber can create an alternate permanent telephone line. An "alternative permanent telephone line" is a telephone line that is moved to the subscriber's new home, business, or other place of use but that would still use the subscriber's old local telephone number. This creates "Virtual Number Portability." With Virtual Number Portability, the subscriber can move all over the country, if not the world, without having to use a new telephone number. keep the same local telephone line. To accomplish this, the telephonic system is programmable to forward the telephone calls to a plurality of alternative permanent telephone numbers based on access codes. Callers who want to reach more than one member of the group, are issued an access code for each member that the caller would like to telephone. This creates "Individual Virtual Number Portability." By "Individual Virtual Number Portability" it is meant that a group of individuals that use a particular telephone line and the associated telephone number would have the ability to move outside of a subscriber's immediate switch area, different members of the group going to individual locales, with all individuals keeping the same local telephone line.

The second telephonic peripheral 40(a) on the POTs phone 90 is call waiting 58(a). The general public is familiar with call-waiting and additional explanation is not necessary. The system 8 is programmable so that only some of the callers may interrupt a telephone call with a call-waiting signal. Others are put through to other telephonic peripherals such a voice mail boxes.

Voice mail boxes 52(a) form a third telephonic peripheral 40(a) associated with a POTS phone 90. The system 8 features any number of voice mailboxes 52(a) to which telephone calls may be directed. A subscriber can program the system 8 so that all calls from person X are sent to one mailbox, all calls for person Y are sent to another, etc. . . .

The system also feature "call query" 54(a) as one of the telephonic peripheral 40(a). The query can regard just about anything desired by the subscriber. The caller is queried and the response to the query forwarded to the subscriber, who would then determine whether to take the call. Under one feature of this option, the subscriber is inquired as to the nature or purpose of the telephone call. Under another option, the call billing 165(a) telephonic peripheral, the callers with (or without) particular access codes could be asked whether or not they would be willing to be billed to have a call completed in a particular manner, such as speaking to the subscriber or access information. The telephone company would then bill the caller using well-known technology.

The public is familiar with personalized messages 92(a). The system is programmable so that the personalized message may be particularly tailored to a caller or a group of callers. Another telephonic peripheral 40(a) associated with the POTs phone is "call limits" 90(a). As the name suggests, this prevents the caller from calling more than a certain number of allotted times.

Turning to the PSTN telephonic peripherals 40(a) not associated with the POTs phone, the system provides any number of one way pagers 41(a). A "one-way pager" is a wireless, Turning to the PSTN telephonic peripherals 40(a) not associated with the POTs phone, the system provides any number of one way pagers 41(a). A "one-way pager" is a wireless, portable device that receives simplex (communications in one direction) messages from a caller over the Public Switched Telephone Network, that is small enough to be kept on the subscriber's person, and that is incapable of a real-time voice conversation. The messages may be numeric, alphanumeric, or some other visual, audio, or tactile indication mechanism such as blinking lights (visual), beeping (audio) or vibration (tactile). Similarly, another telephonic peripheral 40(a) is the two-way pager 41(b). A "two-way pager" differs from a "one-way pager" in that messages may be sent in both directions.

Emergency operator fallback 86(b) is a telephonic peripheral 40(a) that allows the caller to reach an human operator in the case of emergency. It is a "fall back" device in that it can be used when the subscriber is not available, but the caller must be treated immediately by a human operator. Other telephonic peripherals 40(a) include wireless phones 48(b). By "wireless phone" it is meant any wireless phone including an analog cellular phone, a digital phone, or a PCS phone.

Figure 18:
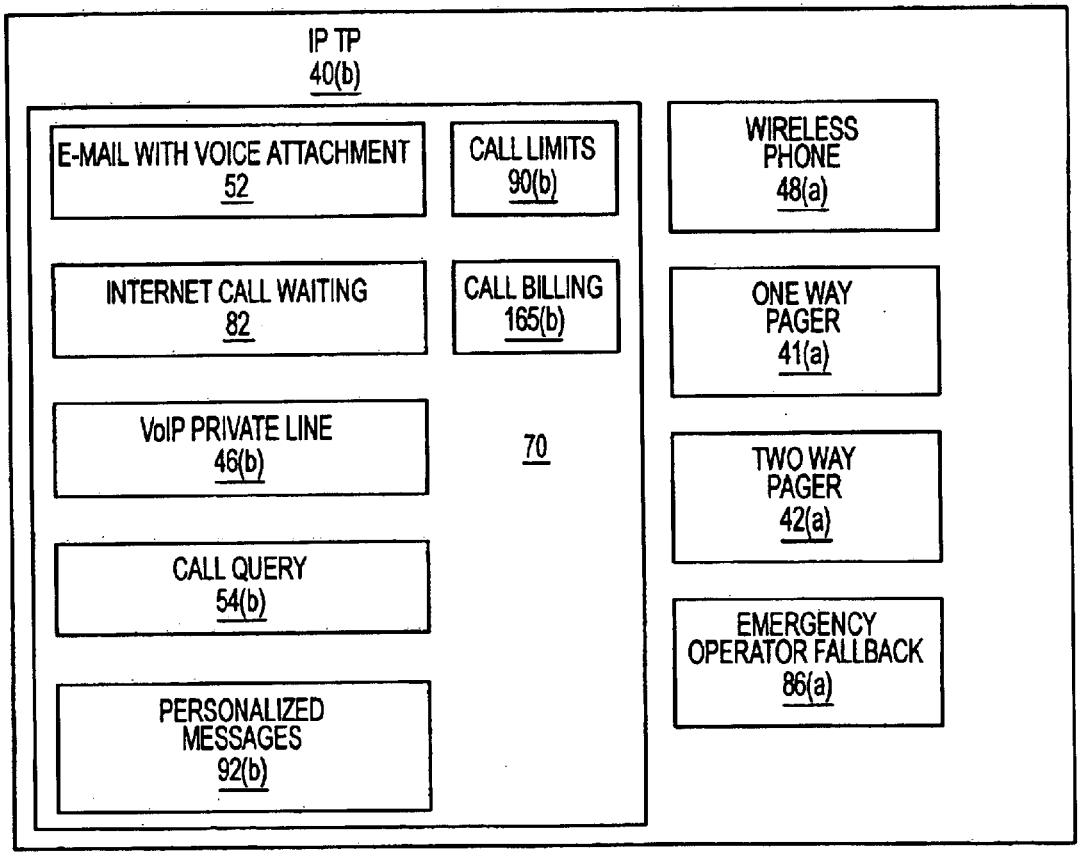
FIG. 18 is a block diagram of the telephonic peripherals on the Internet.

The telephonic peripherals 40(b) associated with the Internet are shown in FIG. 18. Instead of the POTs phone, many IP telephonic peripherals 40(b) are located on the subscriber's home computer 70 and the VoIP phone associated with that computer 70. There are any number of VoIP private lines 46(b), which are similar in nature to their PSTN counterparts except that they are on the Internet and use the Internet Protocol. Many of the telephonic peripheral functions found on the PSTN, are simply duplicated on the Internet, including: Internet one-way pager 41(a), Internet two-way pager 42(b), Internet Emergency Operator Fallback 86(b), IP Wireless Phone 48(b), Call Billing 165(b), and Call Limits 90(a). E-mail with a voice attachment 52 is also available.

Another telephonic peripheral available to the caller would be Internet call waiting 82. With Internet call waiting 82, when the call is placed on the public switched telephone network 14 and the subscriber is on the Internet, the subscriber will receive a prompt informing him that someone is calling. After the prompt, the caller may elect to take the telephone call, which will be translated into packets and sent via VoIP to the subscribers computer terminal 70. The subscriber can then listen to the telephone call without interrupting his Internet web session. This obviates the need for two separate telephone lines if one is to be able to accept a phone call while on the Internet. Converting an analog voice signal into VoIP utilizes well-known technology.

The Access Code Server

Having provided an overview of the telephonic peripherals that are available to callers, the mechanism for programming which telephonic peripherals will be made available to the caller will now be treated. The Access Code Server 26 is a server that is used by the subscriber to program the telephonic system 8. The Access Code Server 26 has a Central Processing Unit, memory, an operating system, and application software. The Access Code Server 26 is located on the Internet and hosts a web page 76 which is used by the subscriber to input call routing data. The purpose of the Access Code Server is to provide a mechanism so that the subscriber can input his preferences over the Internet for routing calls. This call treatment may based on access code, CLID (if it a PSTN phone call) of the caller, or the IP address of the caller (if it is a VoIP telephone call), or a combination thereof.

The Access Code Server 26, which is a Web server, generates a web page 76 using a markup language, preferably the hypertext markup language (HTML). A "mark-up language" is a notation for defining the structure and formatting of a document by using ordinary characters embedded in the text. Mark-up languages allow text to be read by a computer. There are many types of markup languages, the most common being HTML hypertext markup language that is used in most web sites today. HTML allows the client computer the computer at the home or office know how to format text in a web page so that it may be read. "Markup" refers to the sequence of characters or other symbols that you insert at certain places in a text or word processing file to indicate how the file should look when it is printed or displayed or to describe the document's logical structure. The markup indicators are often called "tags." For example, a particular paragraph is preceded by a: <p> or paragraph tag so that when the data is sent over the Internet, the end user will see the text read as new paragraph. Markup can be inserted by the document creator directly by typing the symbols in or by using prepackaged software. The creation of a web page using a Web server and its access using a computer, modern and web browser is well-known.

FIGS. 3 through 12 show web pages located on the Access Code Server 26 to be used with the particular invention. For purposes of simplifying the diagrams, only control of the PSTN telephonic peripherals 40(a) is shown (save for Internet Call Waiting). From this, it will become readily apparent how to create web pages to control the use of Internet telephonic peripherals 40(b). FIG. 3 is a figure of the home page. The subscriber enters the URL of web page 76 on the Access Code Server 26. Here the URL is "http//www.setyourphone.com". FIG. 3 shows the home page which gives general instructions as how to set up the access codes. There are links to get additional instructions, or if the user/subscriber already knows how to use the system, the user may start inputting new information for access codes. These figures are of course exemplary only, and any number of telephonic peripheral may be added.

FIG. 4 is a second web page of the Access Code Server 26 which provides additional information about the telephonic options 40 available to the subscriber.

FIG. 5 shows page 3 of the web page located on the Access Code Server 26. The subscriber simply inputs the access code numbers that he plans to give out. If the numbers spell a name on a Touch-Tone® key pad, the subscriber has an opportunity to record the name as punched on the Touch Tone® key pad of the telephone. As seen in FIG. 5, when the subscriber is done putting in the access codes, the words formed by the access codes and the name of the people who will be given the access codes he may hit "submit" and immediately this information is stored. Immediately, the subscriber is connected to web page 4, which is seen in FIG. 6.

In FIG. 6, at web page 4 of the Access Code Server 26, the subscriber selects the telephonic peripherals. In web page 4 the user has a choice between private lines one and two, voice mail, E-mail with voice attachment, call forwarding, call waiting, personalized message 1, personalized message 2, personalized message 3, call query, pager and call-waiting if the subscriber is on the Internet. Then for the access code under consideration, he may choose the telephonic peripherals of his desire. When the subscriber is done, he may click on a hyperlink and submit his information which will display the options that he has chosen for that given access code (web page not shown). The user may also, next to each option, select time-stamping. If he hits the time-stamping option, he is sent via a hyperlink to web page 5 as shown in FIG. 7. There the user can determine the calendar days which the particular option under question will be available or the days of the week and time of day that they will be available.

Assume a subscriber gives an access code to a friend named Susan. He would like her to have access to the private phone line between the hours of 8 p.m. and 11 p.m., Sunday through Friday. Further assume that during those hours he would like her to be able to interrupt phone calls with call waiting, so he selects call waiting. The subscriber would then go to the home page as seen in FIG. 3, where he would reach the instructions. He would then click on the link that sends him to web page 3 (as seen in FIG. 5) which is an access code entry form. There he enters the access code 783. The access code 783 spells out "Sue" on a Touch Tone® key pad. At the query whether the access code forms a word, he will puts in the word "Sue".

When the subscriber submits the information, he will be automatically sent to web page 4 (FIG. 6) whereupon he will pick the telephonic peripherals that Sue will have. He will click on private line 1. He will then click the time-stamp option next to private line. The time-stamp option will hyperlink to web page 5 as seen in FIG. 7. The subscriber will then pick Option 2-Day of Week, Time of Day Scheduling. Next to Sunday, Monday, Tuesday, Wednesday, Thursday and Friday, he will enter the times 8 p.m. to 11 p.m. He will leave Saturday blank, as he does not want her to have availability to the private line on Saturday. He will then click on "Call Waiting" so Sue can interrupt his calls with call waiting. When he is done, he hits the submit key and is sent back to web page 4 (FIG. 6) to pick additional telephonic peripherals.

When he is done picking telephonic peripherals he hits the submit key and web page 4 (FIG. 6) of the Access Code Server 26 sends him to another web page which shows the access code 783, the name Susan and indicates that the private line may be accessed by "Susan", between the holurs of 8 p.m. and 11 p.m. Sunday through Friday. It also shows that she has call waiting privileges. Thus, when she has access to the private line, she may interrupt another telephone call of the subscriber by call waiting beeps. (This screen is not shown). If the subscriber determines that he made an error, he may return to web page 4 via a hyperlink and correct his errors.

When he is finally done, the subscriber returns to the home page, Web page 1 of the Access Code Server 26, shown in FIG. 3, to start again. From the home page, the subscriber may also turn to Web page 4 of the Access Code Server 26, as shown in FIG. 8, which allows him to input more access codes.

Web page 6 (FIG. 8) of the Access Code Server 26 shows the list of names and access codes given. Names can be deleted if the access codes are ultimately not used. Web page 6 (FIG. 8) may be accessed by Web page 3 (FIG. 5).

From the home page of the Access Code Server as seen in FIG. 3, the subscriber may also want to change the phone numbers of the telephonic peripherals. For instance the telephone number to the private line, the pager, or the cellular phone may change. The E-mail address to the E-mail with voice attachment may need to be changed. From the home page as seen in FIG. 3, the subscriber goes to the web page 6 as seen in FIG. 8, and enters the new telephone number of the private line, the pager, or the cellular phone, or enters a new E-mail address for the E-mail with voice attachment.

From the home page (FIG. 3) of the web site 76 of the Access Code Server 26, the subscriber may click on a hyperlink and set up CLID routing overriding Access Code Routing and is sent to Web page 8 (FIG. 10). Again, telephonic peripherals are offered for calls coming from particular phone numbers (CLID's) as seen in FIG. 11, Web page 9. Web page 9 of the Access Code Server 26 is accessed automatically after filling out Web page 8 (FIG. 10). The telephonic peripherals for CLID routing may be time-stamped as seen in Web page 10, FIG. 12. At Web page 8, FIG. 10, the subscriber may hyperlink to a web page (not shown) that allows caller with subscriber selected access codes to use additional telephonic peripherals not generally available for callers from that CLID.

Once the subscriber has input his preferences into the Access Coder Server 26, the Access Code Server 26 sends an Access Code Preferences Signal 16 to a Database Server 94 which stores the preferences of available telephonic peripherals 14(a) or 14(b) for callers with given access codes 12(*a*) or 12(*b*). The Access Code Server 26 may, or may not, be a part of the same physical computer as the Database Server 94.

The Database Server

The Database Server 94 has a Central Processing Unit, memory, an operating system, and application software. While the Access Code Server 26 serves as the input device, the Data Base Server 94 functions as the storage device, waiting for the Call Router Server 28 to ask for routing data regarding an incoming telephone call 10(*a*) or 10(*b*). Data Base Server 94 stores the data regarding call routing once it is input by the subscriber using the Access Code Server 26. The Data Base Server 94 then waits for an inquiry from CRS 28 about data to route a call intercepted by CRS 28. This inquiry will be sent when the Call Router Server 28 receives an incoming telephone call 10(*a*) or 10(*b*). The Data Base Server 94 has two primary sub-components which can be seen in FIG. 1. An On-Line Register 96 is a register where the subscriber can enter two principle pieces of data: (a) whether the subscriber is on-line or has access to a VoIP phone and (b) if yes to part a, the IP address of the VoIP phone. The data base server storage device 99 stores the data regarding call routing. The storage device 99 functions as the memory of the Data Base Server 94. It matches the stored call routing data in memory on the storage device 99, with access code information sent by the Call Routing Server 28 including CLID information and IP address information, and process it to produce call routing data for the Call Router Server.

The Call Router Server

Figure 15:
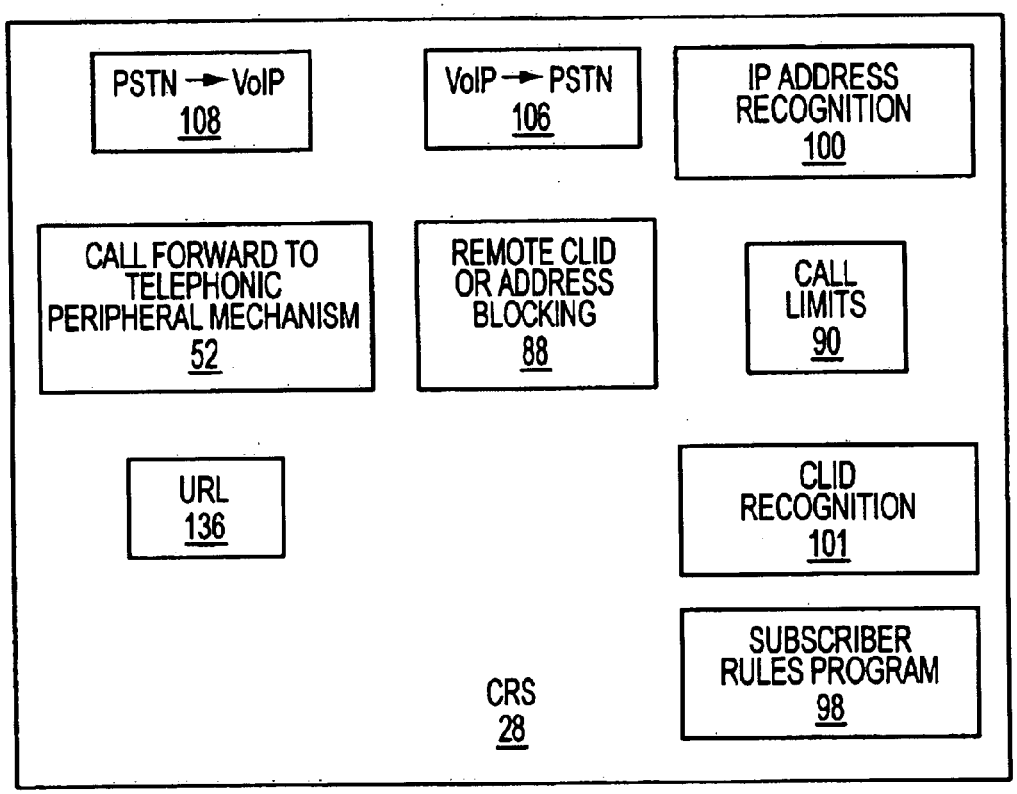
FIG. 15 is a block diagram of the Call Router Server.

The Call Router Server 28 has a Central Processing Unit, memory, an operating system, and application software. It also includes a Subscriber Rules Program 98 that controls the handling of calls in accordance with the access code. The Call Router Server 28 routes the incoming telephone call 10(*a*) or 10(*b*). It takes calls in and routes them to one or more telephonic peripherals 40(*a*) and 40(*b*) in accordance with routing data from the Data Base Server 94. The Call Router Server 28 receives the caller's PSTN telephone call 10(*a*) or VoIP telephone call 10(*b*) and the caller's access code signal. Access code signal 12(*a*) is sent over the PSTN 14 when the telephone call is a PSTN telephone call 10(*a*). Access code signal 12(*b*) is sent over the Internet 32 when the telephone call is a VoIP telephone call 10(*b*). FIG. 1 shows the Call Router Server 28 as part of the entire telephonic system 8. FIG. 15 shows the Call Router Server 28 in isolation with its various sub-components. Upon receipt of a phone call, the Call Router Server 28 then issues an audio prompt (not shown) to the phone upon which the call was made seeking an access code. The caller then inputs an access code. The access code signal labeled 12(*a*) is made over the PSTN 14 when the caller is using a PSTN phone 126. The access code signal labeled 12(*b*) is made over the Internet 32 when the caller is using a VoIP telephone 120.

As seen in FIG. 15, The Call Router Server 28 has a CLID Recognizing Subsystem 101 and an IP Address of Sender Recognizing Subsystem 100 which, as the names suggests, respectively recognize the CLID 120 of the caller if the call is a PSTN phone call 10(*a*), or the IP address 150 of the caller if the call is a VoIP phone call 10(*b*). This subsystem 100 that is called the "CLID and IP Address of Sender Recognizing Subsystem" is simply called the "CLID Recognizing Subsystem" in applications where the communication system is employed to direct incoming VoIP telephone calls. Once the Call Router Server 28 obtains the CLID 120 of the caller in the case of a PSTN phone call 10(*a*), or the IP Address 150 of the caller in the case of a VoIP phone call 10(*b*), and once the Call Router Server 28 has determined the caller entered an Access code, the aforementioned information is sent then to the Database Server 94 by means of an Inquiry Signal 114. This signal ask the Database Server for outgoing routing data for a caller with a particular access code and location (as determined by the CLID or IP Address). The Database Server responds to the inquiry and provides data to the Call Router Server for routing the call.

Once the Call Router Server 28 has the data to route the telephone call 10(*a*) or 10(*b*), the call is directed to the appropriate telephonic peripherals—the PSTN telephonic peripherals 40(*a*) or the VoIP telephonic peripherals 40(*b*). The Call Router Server 28 is capable of receiving calls over the PSTN 14 and sending them to telephonic peripherals 40(*b*) that are on located on the Internet 32. To accomplish this, a PSTN Phone to VoIP Phone Converting Mechanism 108 is employed that is a part of the Call Router Server 28. The PSTN Phone to VoIP Phone Converting Mechanism 108 may either be part of the Call Router Server 28 or connected to it. The PSTN Phone to VoIP Phone Converting Mechanism 108 converts an incoming PSTN phone call 10(*a*) (that may be in analog form or the more usual digital transmission using Pulse Code Modulation), to an Outgoing Internet Call 114(*b*) which is grouped into packets so that it may be sent by packet-switching over the Internet 14. The Call Router Server 28 "knows" the IP Address 150 to send the telephone call from the data sent from the On-Line Register 96 of the Data Server 94, where the subscriber registered that he (or she) was on-line using the On-Line Signal Program 155 on his (or her) computer 70. The Outgoing Internet Call 114(*b*) is then routed to the IP Router 104 which, in turn, directs the Outgoing Internet Call 114(*b*) over the Internet 32 to an Internet Telephonic Peripheral 10(B).

Conversely, the Call Router Server 28 is capable of receiving calls over the Internet 14 and sending them to telephonic peripherals 40(*a*) that are on located on the Public Switched Telephone Network 14. To accomplish this, a VoIP Phone to PSTN Phone Converting Mechanism 106 is employed that is also a part of the Call Router Server 28. This VoIP Phone to PSTN Phone Converting Mechanism 106 converts an incoming VoIP Call 10(*b*) that is in the form of switched packets (in accordance to the Internet Protocol) into a PSTN Outgoing Phone Call 114(*a*). The PSTN outgoing phone call 114(*a*) may be in analog form or the more usual digital transmission using Pulse Code Modulation. This VoIP Phone to PSTN Phone Converting Mechanism 106 has a computer program whereby the VoIP caller is queried as what is the PSTN telephone destination number (i.e., the phone number of the called party). The end destination PSTN telephone number may be typed in by the caller, or input by well-known audio recognition means. In such a manner, the Call Router Server knows to what PSTN Telephonic Peripheral 40(*a*) to send the Outgoing PSTN Telephone Call 114(*a*). Outgoing PSTN Telephone Calls 114(*a*) are directed back by the Call Router Server 28 to the Switch 134 after having been processed. The Switch 134 directs the Outgoing PSTN Telephone Call 114(*a*) to the PSTN telephone number to the appropriate PSTN telephonic peripheral 40(*a*).

The Subscriber's Rules Program

The Subscriber's Rules Program 98 determines how the call is routed by the Call Router Server 28. It generates a Call Routing and Control Information Signal 112 to instruct the Call Router Server 28 how to route the incoming telephone call 10(*a*) or 10(*b*). So instructed, the Call Router Server 28 now knows how to route the incoming PSTN telephone call 10(*a*) or the incoming VoIP phone call 10(*b*).

The Subscriber's Rules Program 98 contains instructions on how to route the telephone call 10(*a*) or 10(*b*) based on the individual CLID 130 of the PSTN phone call 10(*a*), the individual IP address 150 of VoIP Phone Call 10(*b*), or the entered access code. Alternatively, the Subscriber's Rules Program 98 may dictate that the PSTN phone call 10(*a*) should be routed based on a combination of the CLID 130 of the PSTN Phone Call and the access code. Or, the Subscriber's Rules Program 98 may dictate that the VoIP phone call 10(*b*) should be routed based on a combination of the IP Address 150 of the VoIP phone call 10(*b*) and the access code. If the VoIP phone 120 of the caller changes frequently because of the Internet Service Provider (as is often the case), the Subscriber's Rules Program 98 may dictate that simply the access code, sans the IP address 150 of the VoIP phone 120, may be used to designate call treatment for the VoIP phone call 120.

Figure 2:
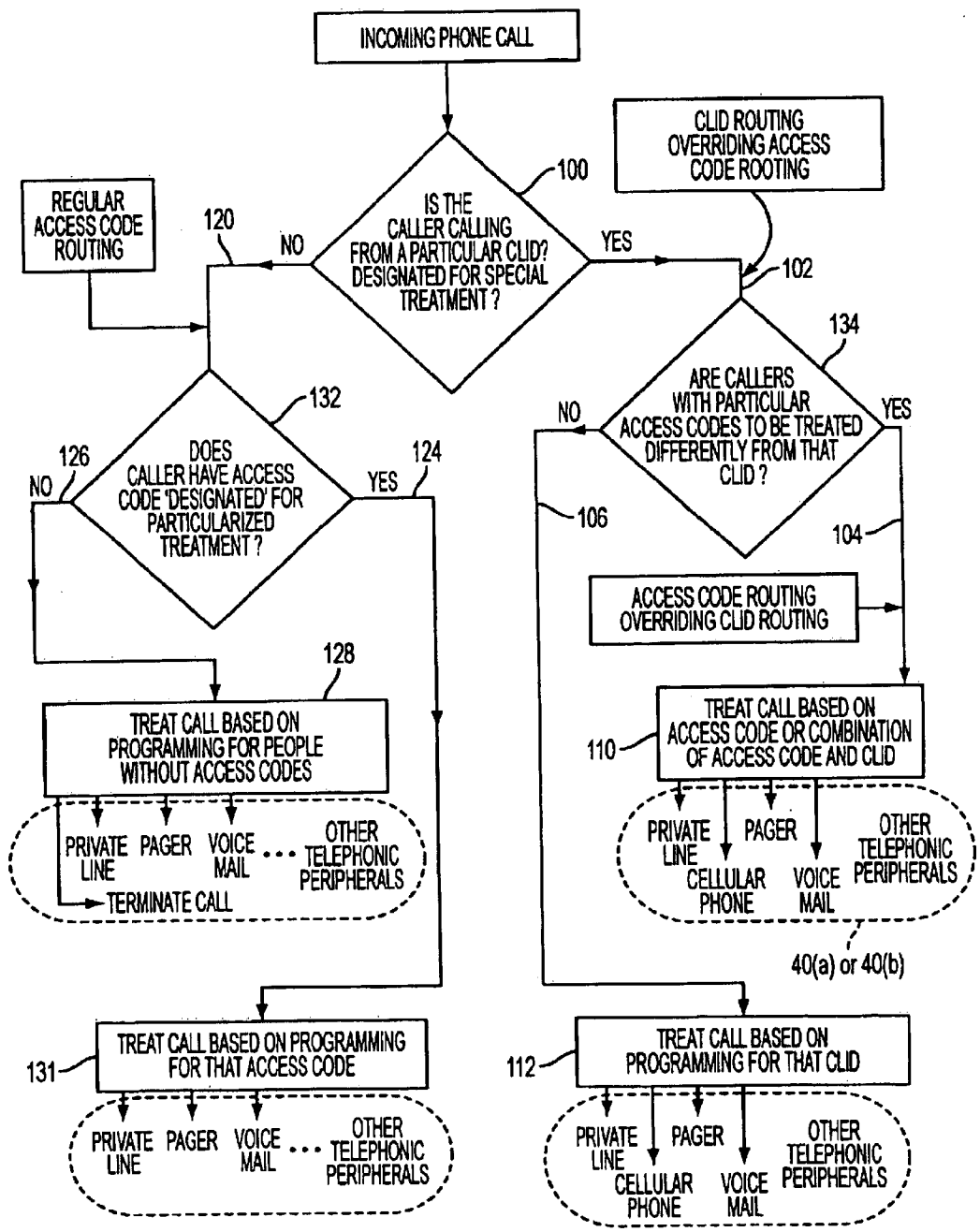
FIG. 2 is a block diagram of Programming for the Access Code Server

FIG. 2 shows a block flow diagram of one of the sub-programs of the Subscriber' Rules Program 98. It is a sub-program of other programs that provide instructions for routing incoming PSTN telephone calls. A similar program (not show) is used for incoming VoIP phone calls 40(*b*) with the simple substitution of IP Addresses 150 for CLIDS 130. As noted, our telephonic system 8 is access code driven. Examining FIG. 2, it can be seen the first query of the subprogram is "if the telephone call is coming from a CLID designated for special treatment" at step 100. Usually the answer to this is "NO" and regular access code routing begins to take place at step 120. The telephonic system 8 may be programmed to allow the subscriber to route certain callers to preselected options without the caller using an access code. For instance, the caller may allow calls to a private line 46 between certain hours, with or without an access code 8. As seen in box 132, the computer program queries "whether the caller has an access code designated for particular treatment?" If the answer is "NO" then the call is treated as one for people without access codes, as seen in Box 128. For instance, the subscriber may decided to politely terminate the telephone call, or have the call sent to a general voice mail box if the caller has no access code.

The telephonic system 8 allows the subscriber to route certain callers to preselected options based upon the Calling Line Identification Number (CLID) of the caller, without the caller using a particular access code. As seen in block 100, when a caller places a telephone call from particular CLIDs (defined above in Summary Section and below in the definition section), the answer to the query of step 100 "Is the caller calling from a particular CLID designated for particular treatment" would be "YES." As mentioned, this feature we call "CLID Routing overriding Access Code Routing" because callers are being routed based on the CLID they are calling from, regardless of whether or not they possess certain access codes. CLID Routing overriding Access Code Routing is demarcated by the number 102.

Even when the telephonic system 8 is programmed to have CLID Routing overriding Access Code Routing 102 for particular telephone lines, this too can be modified. Suppose CLID Routing overriding Access Code Routing is arranged so that calls from a particular telephone line (123-456-7890) will be treated in a particular manner (let's say they are sent to a private line). The Access Code Server 26 could still be programmed to allow the subscriber to override this pro-graming such that the caller could be routed based on the programmed options for his or her access code. Thus, the subscriber may program the Access Code Server 26 to have all calls from 123-456-7890 sent to the private line, unless the caller knows the access code QRS. If the call enters QRS, the call 10 is to be forwarded to the subscriber's cellular telephone.

As mentioned, we call this "Access Code Routing Overriding CLID Routing" because certain callers with particular access codes can override the preselected option for call treatment based on calls emanating from a particular CLID. Access Code Routing Overriding CLID Routing is demarcated by 104. This feature allows certain callers to be treated uniformly, even if they are calling from particular CLIDs that have been selected for particularized treatment. After it is determined that the caller is calling from a CLID designated for special treatment in step 100 so that there is CLID Routing Overriding Access Code Routing 102, the program queries whether "Are callers with particular access codes to be treated differently from other callers from the CLID that do not posses those particular access codes?" as in box 134. If the answer is "YES" the call is treated based on the access code, or combination of access code and CLID, so that there is Access Code Routing Overrides CLID routing as seen in step 110.

Usually, callers from particular CLIDs will not be treated differently even if they have special access codes. This is plain CLID routing. If the answer to the query "Are callers with particular access codes to be treated differently from other callers from the CLID that do not posses those particular access codes?" as in box 134 is "NO", the call is treated as CLID routing overriding Access Code Riding, and the call will be treated based on the programming for that particular CLID as seen in Box 112.

Figure 16:
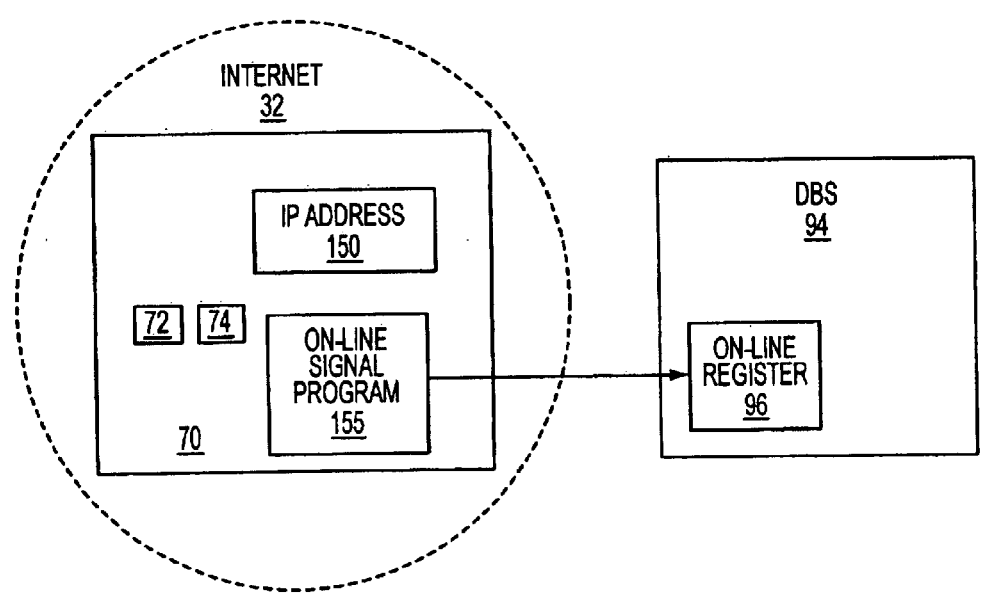
FIG. 16 is a block diagram showing the subsystem that indicates the subscriber is on-line.

Additional information that may be used by the Subscriber's Rules Program 98 is whether the subscriber is currently using his (or her) computer 70 (or otherwise has access to the VoIP Phone 120) so that an outgoing VoIP phone call 114 may be received by the subscriber. As seen in FIG. 16, this is accomplished by the subscriber sending an Internet Access Signal 106 from his (or her) computer 70 to an On-Line Register 96 located on the Database Server 96. This is accomplished using an On-Line Signal Program 155 that is located on the computer 70 that the subscriber is using (as shown). Such an Internet Access Signal 106 generated by the On-Line Signal Program 155 has the capacity to provide the IP address 150 of the VoIP phone 120 the subscriber is currently using, if the subscriber is using a VoIP phone different from his normal settings. In such a manner, the Database Server 94 knows whether the subscriber has access to a VoIP Phone 120, and the IP address of the VoIP phone.

The PSTN Incoming Delivery System

When the incoming telephone call 10(*a*) is placed over the PSTN (14), the call begins at the caller's telephone phone 126 and is sent to Switch 134. The purpose of the PSTN delivery system is take the incoming PSTN phone call 10(*a*), and send it to Switch 134 of the telephonic system 8. There are a number of PSTN Incoming Delivery Systems 164. These PSTN delivery systems, include, but are not limited to Local Number Portability (LNP) 142, Advanced Intelligent Network (AIN) 148, and traditional call-forwarding 146. These three methods are discussed below:

Local Number Portability

Figure 14:
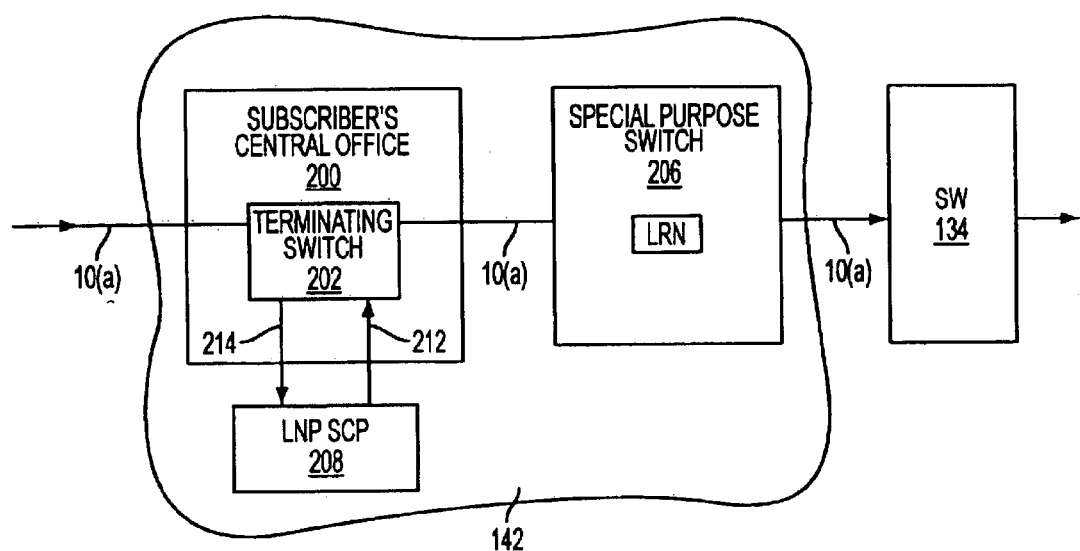
FIG. 14 is a block diagram of Local Number Portability.

Local Number Portability is shown in FIG. 14. Local Number Portability (LNP) 142 is mandated by the Federal Communications Commission to satisfy the requirements of the Telecom Act of 1996 and to permit competition in the local telephone market. LNP 142 is a circuit switched network capability that allows a subscriber on one switching exchange (i.e., end office) to keep the same public directory number (DN) when moving to a different switching exchange. Information needed to process calls in an LNP environment is maintained in an external database. A directory number that has been moved from switch to another is referred to as ported. Other users can connect to ported numbers without any changes to dialing procedures.

Historically, all directory numbers with the same six digits (i.e., the NPA-NXX, area code + plus local exchange) belonged to a single telephone switch. With the introduction of Local Number Portability 142, individual directory numbers in one NPA-NXX may be ported to different telephone switches. This has tremendous implications for call routing, as the first six digits of a directory number no longer uniquely identifies the switch that host the directory number. In so doing, LNP 142 allows a party to change telephone service providers without changing telephone numbers.

LNP 142 is amply described in U.S. application Ser. No. 09/114,068 filed Jul. 13, 1998 by Robert W. Petrunka entitled "Call Forwarding Using Local Line Portability" which is hereby incorporated by reference. With LNP 142, when a call is made to a telephone number in a zone of portability, which is determined by the first six digits of the called number (known as the area code and office code [or exchange], or simply NPA-NXX), a local switch 202 queries an LNP Service Control Point (SCP) 208 by sending a query signal 214 to obtain portability information about the number. The LNP SCP 208 accesses internal databases. If the LNP SCP 208 determines that the number has been ported to a new service provider it returns a Local Routing Number (LRN) 212 and the originally dialed telephone number to the local switch. Each switch 202 which hosts ported numbers has a ten digit Location Routing Number (LRN) to it. As the name suggest, the Location Routing Number routes the telephone call to the location of the switch 206 where the telephone number has been ported. The local switch 202 routes the call 10(a) to a terminating switch of the new service provider 206 using the LRN. The terminating switch 206 uses the originally dialed telephone number to route the call to the intended party. In the present invention, the terminating switch 206 then sends the call to the Switch 124.

The Advanced Intelligent Network

Figure 13:
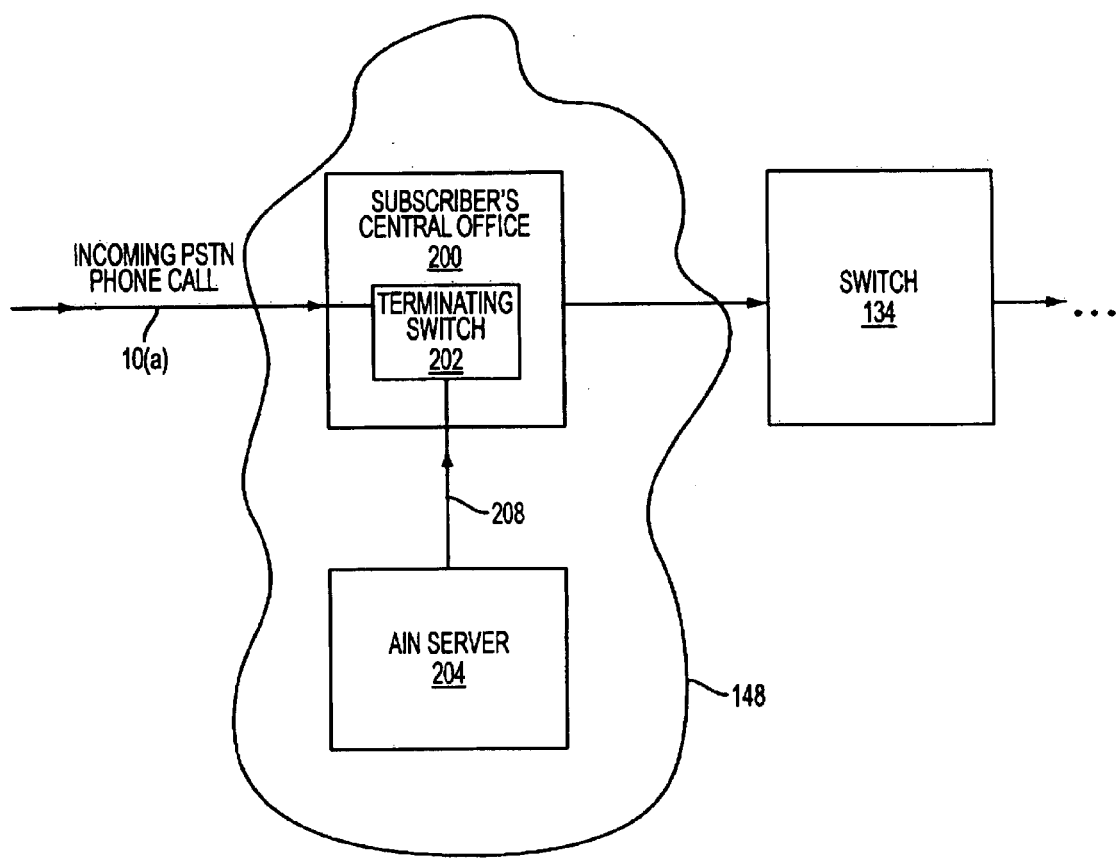
FIG. 13 is a block diagram of the Advanced Intelligent Network.xxx

Another way the telephone call may be directed to the Call Router Server 28 is by use of the Advanced Intelligent Network (AIN) 148 and the use of a Terminating Attempt Trigger (TAT), which is defined for the Advanced Intelligent Network. The Advanced Intelligent Network is shown in FIG. 13. The AIN 148 is also described in U.S. application Ser. No. 09/114,068 filed Jul. 13, 1998 by Robert W. Petrunka entitled "Call Forwarding Using Local Line Portability" which is hereby incorporated by reference. With this technique, a caller dials a subscriber's standard telephone number, such as the telephone number for the subscriber's business telephone. When the call reaches the subscriber's terminating switch 202 located at the subscriber's central office 200, AIN 148 processing connects the AIN server 204 to the call 10(a) at the terminating switch 202. The AIN server 204 instructs the terminating switch 202 to extend the call 10(a) to a the telephone numbers of the Switch 124. Ultimately, the call 10(a) is forwarded to the Switch 134 by the AIN 148.

Call Forwarding

The PSTN call 10(a) could also be sent to the Switch 134 by traditional call forwarding 146. Call forwarding 146 is a well-known service offered by local phone companies to their subscribers that allows a user to make calls dialed to their phone ring to a different phone or phone number.

The Telephonic System in Operation

In operation, the subscriber, using his computer 70 equipped with a modem 72 and a web browser 74 enters access code numbers (or other types of access codes) 11 onto web pages 76 that are stored on Access Server 26. He also enters data indicating the manner of call treatment based on those access codes 11. Call treatment may also be based, in whole or in part, on the CLID or IP address of the caller. As such, the subscriber determines what incoming PSTN telephone calls 10(a) and incoming VoIP telephone calls 40(b) will be routed to what PSTN telephonic peripherals 40(a) and Internet telephonic peripherals 40(b).

The Access Code Server 26 sends a Access Code Preference Signal 16 to the Database Server 94 which indicates call treatment based on access codes, CLID or IP address, or any combination thereof This information is stored on the Database Server 94. The Database Server 94 sends the stored data to the Subscriber's Rules Program 98 in CRS 28 that contains instructions on how to route incoming telephone calls based on access code, CLID or IP Address. The system is then ready to take an incoming PSTN telephone call 10(a) or an incoming VoIP Telephone Call 10(b) and intelligently route it as an outgoing PSTN telephone call 114(a) or outgoing Internet Telephone Call 114(b).

The incoming telephone call may either be over the PSTN 14 or the Internet 32. The incoming telephone call numbered "10(a)" is an incoming telephone call over the Public Switched Telephone Network 14. The incoming PSTN phone call 10(a) maybe made using a POTs phone, a cellular phone, or a digital phone or their equivalents. When such a PSTN call is made, the call 10(a) originates from a particular CLID 130 (i.e., the call is made from a particular telephone number). The incoming telephone call numbered "10(b)" is an incoming telephone call from a caller over the Internet 32, and is made with a VoIP phone 120 or its equivalent. The VoIP phone call 10(b) is placed using a computer equipped with a sound card and a microphone. The Internet phone software samples the incoming audio signal, compresses it, and transmits the package via TCP/IP over the Internet to remote locations. When such a VoIP call 10(b) is made, the call is generated from a particular IP address of the caller 132. Thus, the CLID 130 of the PSTN incoming phone call 10(a) and the IP address 132 of the VoIP incoming telephone call 10(b) both function to indicate the source of the phone call. (There are some systems today whereby the Internet Service Provider that provides the VoIP services frequently changes the IP address of the caller. With such a scenario, the call origin (or more accurately caller origin) is known by the access code entered by the caller.

Both telephone calls 10(a) and 10(b) have destination numbers to indicate where the call is going. With the PSTN phone call 10(a) that is being routed as an outgoing PSTN phone call 114(a), the destination number is simply the common telephone number as it is well-known today. For the VoIP phone call 10(b) that is routed as outgoing Internet call 114(b), the destination number is the IP address 150 of the VoIP phone of the subscriber (which is also the IP address of the subscriber's computer 70). However, unlike the use of the subscriber's regular telephone phone number used with the PSTN telephone call 10(a), to place a call with a VoIP phone, the caller must follow two steps: First, the caller must type at his or her keyboard (or otherwise somehow enter) the web address (URL) 136 of the Call Router Server 28. The VoIP phone call 10(b) will then be placed on the Internet 32 and be sent to an IP Router 104. The IP Router 104 will then route the VoIP phone call 10(b) to the Call Router Server 28. Once the VoIP phone call 10(b) is connected to the Call Router Server 28, the caller is prompted by the Call Router Server 28 to enter the telephone number of the subscriber, or the name of the subscriber, or some other indica to indicate that the call 10(b) is to be directed to the subscriber.

When in operation, an incoming PSTN telephone call 10(a) or 10(b) made by a caller is routed to the Switch 134 by the PSTN Delivery System 164. The PSTN Deliver System 164 is comprised on Local Number Portability 142, Advanced Intelligent Network 148 or Call Forwarding 146. Once the incoming PSTN call reaches the Switch 134, it is sent to the Call Router Server 28. After the PSTN telephone call 10(a) reaches The Switch 134, the Switch 134 then forwards the PSTN telephone call 10(a) to the Call Router Server 28. When a PSTN telephone call 10(a) or VoIP telephone call 10(b) reaches the Call Router Server 28, the caller is prompted for an access code before the call is connected further. By entering an access code from the PSTN Phone 126, the caller generates a caller's access code signal 12(a) that is transmitted over the Public Switched Telephone Network 14 to the Switch 134 to the Call Router Server 28. By entering an access code from the VoIP Phone 120, the caller generates a caller's access code signal 12(b) that is transmitted over the Internet 32 to an IP Router 104 to the Call Router Server 28. Incoming VoIP calls 10(b) pass to the IP Router 104, where they are then, in turn, routed from IP Router 104 to the call Router Server 28.

When the call 10(a) is placed over the PSTN, the access code could be generated by a touch-pad-alpha-numeric device, such as the caller's touch pad phone. When the access code is a touch-tone-alpha-numeric access code, the access code signal 12 could be generated using DTMF technology, although it is conceivable that other technologies could be utilized. With dual-tone multifrequency, the key pads on a phone are assigned two signals of differing frequencies. The telephone system "knows" what key pad was hit by matching the two signals to the key pad assigned to it. When the telephone call 10(b) is made using a VoIP Phone 120, the access code may be manually entered at the keyboard. Whether by PSTN phone 126 or VoIP phone 120, the caller's access code could also be a verbal-alpha-numeric access code whereby the caller simply verbally states the access code and the telephonic system 8 recognizes it. Likewise, whether the phone is a PSTN phone 126 or a VoIP phone 120, the access code could even be the caller's voice itself. With such voice recognition technology, there is no need to speak with particular words. Rather, the telephonic system 8 could recognize the unique nature of the callers voice using well-known existing voice recognition technology. Under such a system, the caller would have to provide voice samples so that there is a model with which to compare.

The Inquiry Signal 114 signals the Database Server 94 for instructions regarding call treatment based on the CLID 130 (if it is a PSTN phone call) or the IP address 150 (if it is a VoIP phone call) and the access code.

Once the telephone call reaches the Call Router Server 28, the incoming call 10(a) or 10(b) is directed to the correct telephonic peripheral 40(a) or 40(b). The Call Router Server 28 can route incoming PSTN telephone calls 10(a) to either PSTN or VoIP telephonic peripherals. Likewise, the Call Router Server 28 can route incoming VoIP calls to either PSTN or VoIP telephonic peripherals, 40(a) and 40(b) respectively. The Call Router Server 28 has a PSTN to VoIP Phone Converting Mechanism 108, and a VoIP Phone to PSTN Phone Converting Mechanism 106. The Call Router Server also has a Remote CLID or IP Addressing Blocking Mechanism that allows the subscriber to block calls made from particular CLIDs or IP addresses.

Upon receipt of the incoming telephone call 10(a) or 10(b), the Call Router Server 28 sends the access code, CLID or IP Address of the Caller and simultaneously ask for data on call routing based on those parameters. The CRS 28 processes these parameters using the Subscriber's Rules Program that generates the Call Routing and Control Information Signal 112 which instructs the Call Router Server 28 how to route the incoming telephone call 10(a) or 10(b). The Call Router Server 28 then routes the incoming telephone call 10(a) or 10(b) to the correct telephonic peripheral 40(a) or 40(b), based on those instructions.

Alternative Embodiments

It is contemplated that the Access Code Server 26 and the Database Server 94 may be a part of the same computer. It is also contemplated that the Database Server 94 may be a part of the same computer as the Call Router Server 28. It is further contemplated that the Access Code Server 26, the Database Server 94, and the Call Router Server 28 may be a part of the same computer. It is contemplated that any number of software codes may be implemented to program the three servers.

Definitions:

An "access code" is a code that is optimally alphanumeric but is not so limited, which a subscriber distributes to callers so that the calls may be routed in accordance with the subscriber's choice. An access code can be (but is not limited to) a DTMF signal, a verbally stated word or number, or the caller's own voice which may be recognized.

By "the access code being the caller's own voice" it is meant that the telephonic system recognizes the caller's voice without the use of a particular verbal alphanumeric access code, which is defined below. As an example, instead of the caller having to verbally state the word "apple" or "seven-two-one" he (or she) may simply have to speak long enough so that his (or her) voice is recognized.

A "caller" is any individual or device that sends telephonic messages on the public telephone network.

A "Calling Line Identification Number" or "CLID" is the phone number of the telephone line that the caller is using.

By "electrically coupled" it is meant related in some way so that electrical signals or data from one device is communicated to the other device. The electrical coupling can be done with or without wiring. The coupling may or may not be of a continues nature. The electrical coupling could be done via radio signals or light waves (low power laser beams). "Electrically coupled" includes a computer related to a computer network.

An "Internet gateway" is a gateway that connects the Internet to the public switched telephone network. See definition of "gateway."

A "server" as used in the specification and the claims, is a computer that is programmed to send files or other information including telephonic information to another computer or a telephonic peripheral. A "computer" (as used in the definition of "server") is any device having a Central Processing Unit, memory, an operating system, and application software that receives data or telephonic information, or both as an input, processes the same, and produces an output of data or telephonic information or both. In the specification and in the claims, the Access Code Server, the Database Server, and the Call Router Server are all types of servers subject to the above definition. See definition of "telephonic peripheral" provided below.

A "subscriber" is any end user of telecommunications services, regardless whether a fee is paid, or whether the user is the ultimate end user, or whether the user is a person or other entity.

By "telephone call" it is meant converting sound waves into variations of electric current that can be sent over wires and reconverted into sound waves at a distant point in real time so as to make it possible to have a live conversation from two different locales. The term "telephone call" includes, but is not limited to, a POTs (Plain Old Telephone) telephone call, a Cellular Telephone Call, PCS (personal communications service) or a Voice Over the Internet telephone call and includes wireless transmissions of any sort that uses electrical or electromagnetic energy.

By "telephonic peripheral" is meant any end-user device that is interconnected to a telephone network and is capable of being used in conjunction with the pubic telephone system or the Internet to provide additional service.

"Telephony" is the transmission of speech or sound to a distant point by means of electrical signals.

By "time stamping the access code" it is meant allowing the access code to be valid for a predetermined period of time.

A "verbal alphanumeric access code" is an access code consisting of alphanumeric information that was generated by the caller's verbal statement of a letter, word, number, or combination of letters, words and numbers.

By "voice over the Internet" (VoIP) it is meant sending or receiving voice information as packets over the Internet, rather than along a dedicated circuit connection as a regular telephone call. Voice over the Internet is sometimes referred to as "Internet telephony." Voice over the Internet software allows users to communicate with one another over the Internet as they would over a regular telephone line. Typically, both users use computers. However, the call may be received using a VoIP phone but transmitted using a POTs phone. When used in the telephonic system of the invention, the caller could use a POTs telephone only, and pay for the call to telephone number of the subscriber. The subscribe could then have the call forwarded to any part of the world accessible by phone lines without additional long-distance charges using VoIP technology. VoIP technology is well-known in the field of telephony. "VoIP" is a term used in IP telephony for a set of facilities for managing the delivery of voice information using the Internet Protocol (IP). In general, this means sending voice information in digital form in discrete packets rather than in the traditional circuit-committed protocols of the public switched telephone network (PSTN). The term "VoIP" is now used somewhat generally. The term "VoIP" derives from the VoIP Forum, which is an effort by major equipment providers to promote the use of ITU-T H.323 (which is one standard for sending voice (audio) and video using IP on the public Internet and within intranets). As used in the specification and in the claims, the term "VoIP" is any protocol designed to facilitate or enable a live telephone call to be transmitted in whole or in part by being in the form of switched packets sent over a public packet-switching network such as the Internet.

A "Web server" is a server located on a public packet-switching network such as the Internet. The Internet includes but is not limited to the World Wide Web. The "Web server" may be located on parts of the Internet other than the World Wide Web.

We claim:

1. A communications system for controlling the flow of a telephone call comprising:
    a Call Router Server in communication with a Database Server and an Access Code Server in communication with the Database Server,
    the Call Router Server for receiving an incoming PSTN telephone call from a Public Switched Telephone Network (PSTN) and for routing the call in accordance with instructions received from the Database Server, said telephone call made by a caller over the PSTN to a subscriber, said Call Router Server having a Subscriber Rules Program containing instructions for routing incoming PSTN telephone calls to the subscriber, said Call Router Server receiving from the caller an incoming access code signal representing an access code generated by the caller and transmitted over the PSTN, the Call Router Server routing the incoming PSTN telephone call as an outgoing telephone call based in whole or in part on the access code,
    the Database Server in communication with the Call Router Server and the Access Code Server for storing routing data received from the Access Code Server and for receiving an access code from the Call Router Server and generating data signals for routing the incoming PSTN telephone call in accordance with routing instructions corresponding to the access code, and
    the Access Code Server in communication with the Database Server, coupled to a public packet-switching network such as the Internet and hosting a web page accessible by the subscriber, said Access Code Server receiving from the subscriber one or more access codes and one or more sets of routing data corresponding to each access code for directing the routing of a call and generating an Access Code Preference Signal comprising information for routing a call in accordance with a given access code.

2. The communications system for controlling the flow of a telephone call of claim 1 further comprising:
    the outgoing telephone call being an outgoing Internet phone call; and
    the Call Router Server having a PSTN Phone to VoIP Phone Converting Mechanism.

3. The communications system of claim 1 wherein one subscriber selected access code provides a caller with restricted access to at least one PSTN telephonic peripheral from the group consisting essentially of one-way pagers, two-way pagers, emergency operator fallback, wireless phones, call waiting, call query, voice mail boxes, personalized messages, and video conferencing.

4. The communications system of claim 3 where the Access Code Server is programmable to allow access to telephonic peripherals for predefined periods of time.

5. The communications system of claim 1 wherein one subscriber selected access code provides a caller with restricted access to at least one Internet telephonic peripheral from the group consisting essentially of Internet one way pagers, Internet two way pagers, emergency operator fallback, e-mail with voice attachment, Internet call waiting, call query, personalized messages, Internet call limits and Internet video conferencing.

6. The communication system of claim 1 wherein one subscriber selected access code provides a caller with restricted access to one or more PSTN private lines.

7. The communication system of claim 1 wherein one subscriber selected access code provides a caller with restricted access to one or more VoIP private lines.

8. The communications system of claim 1 wherein the access code is a DTMF signal.

9. The communications system of claim 1 wherein the access code is a verbal alphanumeric access code.

10. The communications system of claim 1 wherein the access code is the caller's own voice.

11. The communications system of claim 1 further comprising:
    the Call Router Server having a CLID Recognizing Subsystem to determine the CLID of an incoming telephone call and further comprising a Subscriber Rules Program containing instructions on how to route the telephone call based at least part upon the CLID of the telephone call;

the Access Code Server programmable to override access code programmed call routing in accordance with one or more selected CLIDS, the Access Code Server sending selected CLID call routing data to the Database Server;

the Database Server storing CLID call routing data, the Database Server sending call routing data to the Call Router Server based at least in part on the CLID of the incoming telephone call.

12. The communications system of claim 11 further comprising:

the Access Code Server programmable to override CLID call routing with access code call routing, the Access Code Server sending access code call routing data to the Database Server;

the Subscriber Rules Program of the Call Router Server programmed to determine if the access code sent by a caller is an access code programmed to override CLID call routing;

the Database Server sending call routing data to the Call Router server.

13. The communications system of claim 1 wherein the Access Code Server is programmable by the subscriber to forward callers to an alternative permanent telephone number so as to create Virtual Number Portability.

14. The communications system of claim 13 wherein the Access Code Server is further programmable by the subscriber to input the manner in which incoming telephone calls will be received by the alternative permanent telephone number.

15. The communications system of claim 1 wherein the Access Code Server is programmable by the subscriber to have certain callers be queried based on their access codes and having the query forwarded to the subscriber who may then decide the manner in which the call will be routed.

16. The communications system of claim 1 wherein the Access Code Server is programmable by the subscriber to have certain callers be queried based on their failure to provide access codes and having the query forwarded to the subscriber who may then decide the manner in which the call will be routed.

17. The communication system of claim 1 wherein the PSTN incoming phone call further comprises and transfers the call to a switch using one or more of local number portability, call forwarding, or an Advanced Intelligent Network.

18. A communications system for controlling the flow of a telephone call comprising:

an Access Code Server for receiving call routing data, said Access Code Server located on a public packet-switching network such as the Internet;

a Database Server selectively coupled to the Access Code Server for receiving and for storing said call routing data; and a Call Router Server for routing incoming telephone calls to telephonic peripherals in accordance with instructions received from said Database Server, wherein the Call Router Server comprises means for providing limited access to a private line using a public line.

19. The communication system of claim 18 wherein the Call Router Server further comprises means for routing an incoming PSTN phone call to a VoIP phone.

20. The communication system of claim 18 wherein the Call Router Server further comprises means for routing an incoming VoIP phone call to a PSTN phone.

21. The communication system of claim 18 wherein the Call Router Server further comprises means for routing an incoming PSTN phone call to a PSTN telephonic peripheral.

22. The communication system of claim 18 wherein the Call Router Server further comprises means for routing an incoming PSTN phone call to an Internet telephonic peripheral.

23. The communication system of claim 18 wherein the Call Router Server further comprises means for routing an incoming VoIP phone call to a PSTN telephonic peripheral.

24. The communication system of claim 18 wherein the Call Router Server further comprises means for routing an incoming VoIP phone call to an Internet telephonic peripheral.

25. The communications system of claim 18 wherein the Call Router Server further comprises:

means for selecting at least one telephonic peripheral from the group consisting essentially of one-way pagers, two-way pagers, emergency operator fallback, wireless phones, private lines, call waiting, call query, voice mail boxes, personalized messages, and video conferencing.

26. A communications system for controlling the flow of a telephone call comprising:

an Access Code Server for receiving call routing data, said Access Code Server located on a public packet-switching network such as the Internet;

a Database Server selectively coupled to the Access Code Server for receiving and for storing said call routing data; and a Call Router Server for routing incoming telephone calls to telephonic peripherals in accordance with instructions received from said Database Server, wherein the Call Router Server comprises means for providing Virtual Number Portability.

27. A communications system for controlling the flow of a telephone call comprising:

an Access Code Server for receiving call routing data, said Access Code Server located on a public packet-switching network such as the Internet;

a Database Server selectively coupled to the Access Code Server for receiving and for storing said call routing data, wherein the Database Server comprises means for providing Individual Virtual Number Portability; and a Call Router Server for routing incoming telephone calls to telephonic peripherals in accordance with instructions received from said Database Server.

28. A communications system for controlling the flow of a telephone call comprising:

an Access Code Server for receiving call routing data, said Access Code Server located on a public packet-switching network such as the Internet;

a Database Server selectively coupled to the Access Code Server for receiving and for storing said call routing data; and a Call Router Server for routing incoming telephone calls to telephonic peripherals in accordance with instructions received from said Database Server, wherein the Call Router Server comprises means for providing CLID Routing overriding Access Code Routing.

29. The communications system of claim 28 wherein the Call Router Server further comprises means for providing Access Code Routing overriding CLID routing.

30. A communications system for controlling the flow of a telephone call comprising:

a Call Router Server for receiving and controlling an incoming VoIP telephone call made by a caller to a subscriber over a public packet-switching network, said Call Router Server also for receiving an incoming access code signal representing an access code, where the access code signal is generated by the caller and transmitted over an Internet, the Call Router Server routing the incoming VoIP telephone call as an outgoing telephone call based in whole or in part on the access code, the Call Router Server having a Subscriber Rules Program containing instructions for routing the incoming VoIP telephone call, the Subscriber Rules Program generating a Call Routing and Control Information Signal which instructs the Call Router Server how to route the incoming VoIP telephone call;

a Database Server in communication with the Call Router Server for supplying call routing data of the subscriber to the Call Router Server; and an Access Code Server in communication with the Database Server for receiving access codes and information regarding call treatment based in whole or in part on the access code, the Access Code Server located on a public packet-switching network and hosting a web page for access by the subscriber and generating an Access Code Preference Signal containing information as to the desired call routing for a given access code.

31. The communications system of claim 30 further comprising:

the outgoing telephone call is an outgoing PSTN phone call; and the Call Router Server having a VoIP Phone to PSTN Phone Converting Mechanism.

32. The communications system of claim 30 wherein one subscriber selected access code provides a caller with restricted access to at least one PSTN telephonic peripheral from the group consisting essentially of one-way pagers, two-way pagers, emergency operator fallback, wireless phones, private lines, call waiting, call query, voice mail boxes, personalized messages, and video conferencing.

33. The communications system of claim 30 wherein one subscriber selected access code provides a caller with restricted access to at least one Internet telephonic peripheral from the group consisting essentially of Internet one way pagers, Internet two way pagers, emergency operator fallback, e-mail with voice attachment, Internet call waiting, VoIP private lines, call query, personalized messages, Internet call limits, and Internet video conferencing.

34. A communications system for controlling the flow of a telephone call comprising:

a Call Router Server in communication with a Database Server and an Access Code Server in communication with the Database Server, the Call Router Server for receiving an incoming PSTN and VoIP telephone call and an access code generated by a caller and for routing the incoming call in accordance with data received from the Database Server, the Call Router Server routing the incoming telephone call as an outgoing PSTN or VoIP telephone call based in whole or in part on the access code, the Call Router Server having a Subscriber Rules Program containing instructions for routing incoming PSTN and VoIP telephone calls to the subscriber;

the Database Server in communication with the Call Router Server and the Access Code Server, the Database Server receiving an access code from the Call Router Server and generating data for the Call Router Server Subscriber Rules Program to route the incoming telephone call in accordance with routing instruction corresponding to the access code; and the Access Code Server in communication with the Database Server, coupled to a public packet-switching network such as the Internet and hosting a web page accessible by the subscriber, said Access Code Server receiving from the subscriber one or more access codes and one or more sets of routing information corresponding to each access code for directing the routing of a call and generating an Access Code Preference Signal comprising information for routing a call in accordance with a given access code.

35. The communication system of claim 34 where the PSTN incoming phone call further comprises and transfers the call to a switch using one or more of local number portability, call forwarding, or an Advanced Intelligent Network.

* * * * *